(12) United States Patent
Tsuchiya

(10) Patent No.: US 10,770,810 B2
(45) Date of Patent: Sep. 8, 2020

(54) BATTERY TERMINAL COVER

(71) Applicant: Sumitomo Wiring Systems, Ltd., Yokkaichi, Mie (JP)

(72) Inventor: Takahiro Tsuchiya, Mie (JP)

(73) Assignee: Sumitomo Wiring Systems, Ltd. (JP)

(*) Notice: Subject to any disclaimer, the term of this patent is extended or adjusted under 35 U.S.C. 154(b) by 0 days.

(21) Appl. No.: 16/228,859

(22) Filed: Dec. 21, 2018

(65) Prior Publication Data
US 2019/0199018 A1 Jun. 27, 2019

(30) Foreign Application Priority Data

Dec. 22, 2017 (JP) .................. 2017-246291

(51) Int. Cl.
| | | |
|---|---|---|
| *H01M 2/04* | (2006.01) | |
| *H01R 11/28* | (2006.01) | |
| *H01M 2/34* | (2006.01) | |
| *H01M 2/30* | (2006.01) | |

(52) U.S. Cl.
CPC ............ *H01R 11/284* (2013.01); *H01M 2/04* (2013.01); *H01M 2/302* (2013.01); *H01M 2/344* (2013.01); *H01R 11/283* (2013.01); *H01M 2220/20* (2013.01)

(58) Field of Classification Search
CPC ...... H01R 11/283; H01R 11/284; H01M 2/04; H01M 2/302; H01M 2/344; H01M 2220/20
See application file for complete search history.

(56) References Cited

U.S. PATENT DOCUMENTS

| | | | | |
|---|---|---|---|---|
| 4,778,408 A | * | 10/1988 | Morrison ............... | H01R 11/28 439/522 |
| 5,439,759 A | * | 8/1995 | Lippert .................. | H01M 2/32 174/138 F |
| 5,645,448 A | * | 7/1997 | Hill ....................... | H01H 85/205 439/522 |
| 5,804,770 A | * | 9/1998 | Tanaka .................. | H01M 2/206 174/138 F |
| 6,346,011 B1 | * | 2/2002 | Ikeda .................... | H01M 2/1077 439/500 |
| 6,426,465 B1 | * | 7/2002 | Kosuge ................. | H01R 11/284 174/135 |

(Continued)

FOREIGN PATENT DOCUMENTS

| | | | |
|---|---|---|---|
| JP | 2010092753 A | * | 4/2010 |
| JP | 2010-108785 | | 5/2010 |
| JP | 2015076332 A | * | 4/2015 |

*Primary Examiner* — Edwin A. Leon
*Assistant Examiner* — Milagros Jeancharles
(74) *Attorney, Agent, or Firm* — Gerald E. Hespos; Michael J. Porco; Matthew T. Hespos

(57) ABSTRACT

A battery terminal cover (1) is mounted on a battery (2) to be installed in a vehicle and includes a body (10) to be fixed to the battery (2), a movable portion (20) coupled to the body (10) via hinges (50) and rotatably displaceable to a shielding position to cover a screw member bolt (6) mounted on the battery (2) and an open position to be overlapped on the body portion (10), and a tool restricting portion (30) provided on the movable portion (20) and configured to restrict the rotation of a tool (T) by interfering with the tool before the tool rotated about the screw member (6) contacts the vehicle with the movable portion (20) set at the open position.

14 Claims, 23 Drawing Sheets

(56) References Cited

U.S. PATENT DOCUMENTS

| | | | | |
|---|---|---|---|---|
| 6,512,177 B2 * | 1/2003 | Kosuge | ................ | H01R 11/284 174/135 |
| 6,576,838 B2 * | 6/2003 | Matsumura | .......... | H01H 85/044 174/135 |
| 6,828,058 B2 * | 12/2004 | Ohtsuka | ................ | H01M 2/043 429/121 |
| 7,046,115 B2 * | 5/2006 | Higuchi | ............... | H01H 85/044 337/193 |
| 7,978,046 B2 * | 7/2011 | Ohashi | ................ | H01H 85/044 337/186 |
| 8,492,015 B2 * | 7/2013 | Ramakrishnan | ...... | H01M 2/043 174/138 F |
| 8,933,338 B2 * | 1/2015 | Ikeda | .................... | H01M 2/305 174/138 F |
| 9,209,550 B2 * | 12/2015 | Kinoshita | ............. | H01M 2/206 |
| 9,281,613 B2 * | 3/2016 | Kinoshita | .............. | H01R 13/60 |
| 9,287,672 B2 * | 3/2016 | Nakayama | ............ | H01M 2/206 |
| 9,412,989 B2 * | 8/2016 | Kinoshita | ........... | H01M 2/1077 |
| 9,774,022 B2 * | 9/2017 | Shitamichi | ................ | H01G 2/04 |
| 9,831,652 B2 * | 11/2017 | Nakayama | .......... | H01M 2/1077 |
| 9,837,735 B2 * | 12/2017 | Carnick | ................ | B60R 16/0215 |
| 10,014,603 B2 * | 7/2018 | Onoda | ................. | H01R 11/287 |
| 10,211,438 B2 * | 2/2019 | Ohashi | ................ | H01M 2/1072 |
| 10,347,878 B2 * | 7/2019 | Tsukiyoshi | .............. | H01M 2/04 |
| 10,391,155 B2 * | 8/2019 | Young | ................ | A61K 39/0002 |
| 2002/0050382 A1 * | 5/2002 | Kosuge | ................ | H01R 11/284 174/66 |
| 2012/0100418 A1 * | 4/2012 | Ramakrishnan | ...... | H01M 2/043 429/175 |
| 2014/0315441 A1 * | 10/2014 | Kinoshita | ........... | H01M 2/1077 439/627 |
| 2017/0125750 A1 * | 5/2017 | Tsukiyoshi | .............. | H01M 2/04 |
| 2019/0288249 A1 * | 9/2019 | Shiohama | ............. | H01M 2/024 |

* cited by examiner

BATTERY TERMINAL COVER

BACKGROUND

Field of the Invention

This specification relates to a battery terminal cover.

Related Art

Japanese Unexamined Patent Publication No. 2010-108785 discloses a cover for protecting a terminal projecting from a battery. The battery connection terminal protection cover includes a fuse unit protecting portion disposed along a side surface of the battery and a terminal protecting portion coupled to the fuse unit protecting portion via a hinge. A battery post projects up from the upper surface of the battery and an electrical connection part is wound and fastened by a bolt on the outer periphery of the battery post. The terminal protecting portion can cover the battery post and the bolt with a clearance formed between the terminal protecting portion and the battery post. The bolt can be rotated up about the vicinity of the hinge to be opened for an operation such as battery exchange.

In this configuration, the terminal protecting portion is opened for battery exchange or the like, and the bolt is loosened using a tool. However, the rotated tool may hit a vehicle body and damage the vehicle body.

SUMMARY

This specification relates to a battery terminal cover to be mounted on a battery to be installed in a vehicle. The battery terminal cover includes a body to be fixed to the battery. A movable portion is coupled to the body via a hinge. The movable portion is rotatably displaceable to a shielding position to cover a screw mounted on the battery and an open position to overlap the body. A tool restricting portion is provided on the movable portion and restricts rotation of a tool by interfering with the tool before the tool rotated about the screw contacts the vehicle when the movable portion is open. According to this configuration, the tool rotated about the screw contacts the tool restricting portion to restrict any further rotation. Thus, the tool comes will not contact and damage the vehicle.

The body includes a fixed ceiling plate coupled to the hinge, and the movable portion includes a movable ceiling plate coupled to the hinge. The tool restricting portion may project farther in an axial direction of the hinge than the movable portion, and at least one of the movable ceiling plate and the fixed ceiling plate portion may include a lateral displacement restricting portion that is lockable to the other when the movable portion is at the open position. pressing force from the tool may be transferred from the tool restricting portion to the movable portion. This force could displace the movable portion rotationally about the hinge and the movable portion may be displaced from the body. However, according to this configuration, the lateral displacement restricting portion is provided on at least one of the movable ceiling plate and the fixed ceiling plate and locks the other. Thus, a lateral displacement of the movable portion is restricted. In this way, rotation of the tool is restricted reliably by preventing displacement of the tool restricting portion.

The movable portion may include a movable side plate projecting in a direction separating from the body at the open position, and the tool restricting portion may be on the movable side plate. According to this configuration, the tool restricting portion is at a position separated from the body according to a projecting height of the movable side plate when the movable portion is at the open position. Thus, the tool restricting portion can be arranged at a desired position in a height direction from the body.

The battery terminal cover may further include an angle setting portion configured to support the movable portion at an acute angle to the body to separate the movable portion from the body when the movable portion is at the open position. The tool restricting portion is arranged according to an angle at which the movable portion is supported and can be arranged at a desired position.

The angle setting portion may project up from the body, and the lateral displacement restricting portion may be on an upper part of the angle setting portion. Accordingly, the angle setting portion can double as the lateral displacement restricting portion, and the number of parts can be reduced.

DETAILED DESCRIPTION

Figure 1:
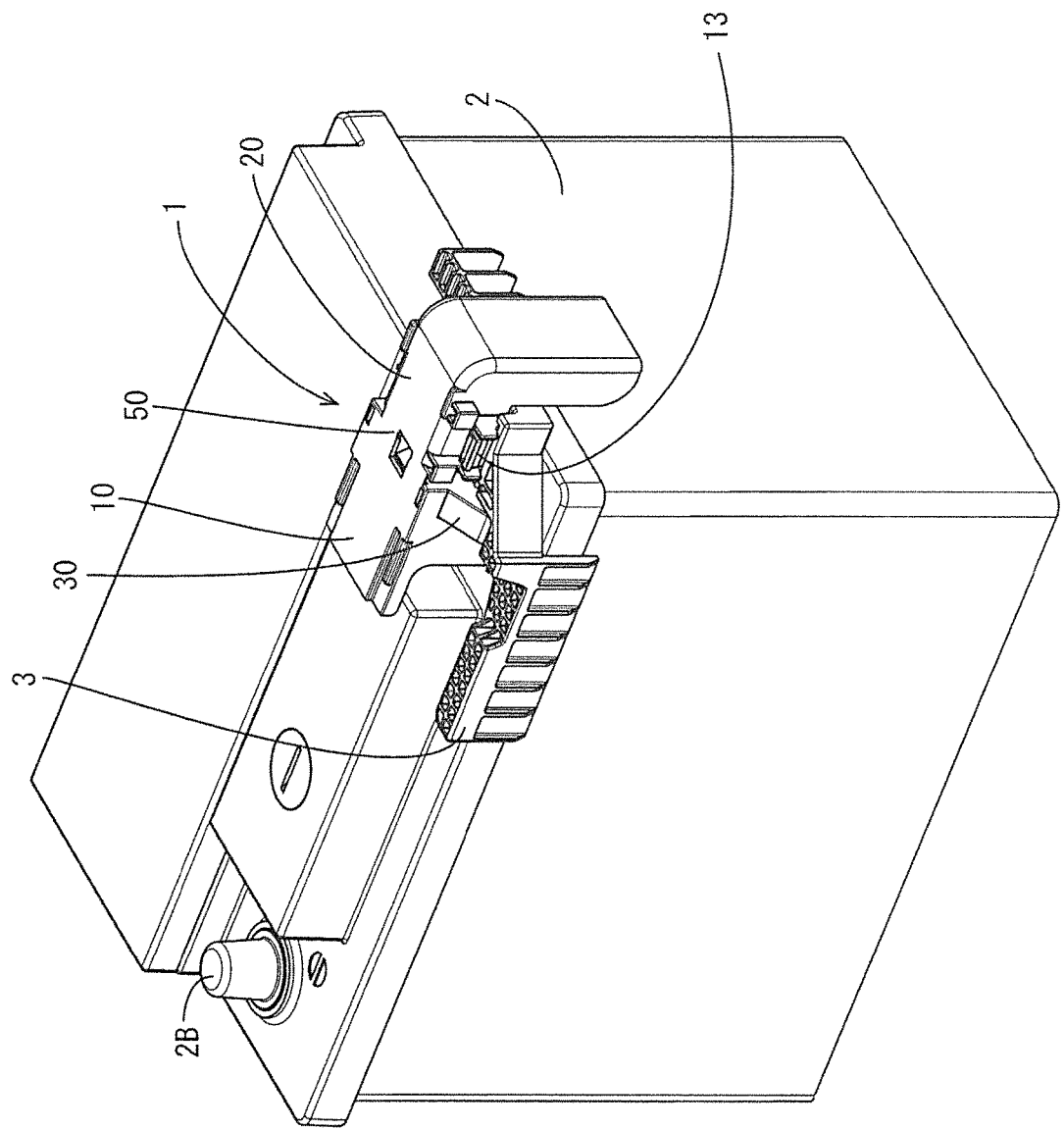
FIG. 1 is a perspective view of a battery terminal cover according to a first embodiment when viewed from behind.

A first embodiment is described with reference to FIGS. 1 to 16. A battery terminal cover 1 of this embodiment is mounted on an upper surface side of a battery 2 for a vehicle, as shown in FIG. 1, to cover and protect a positive electrode 2A and its periphery shown in FIG. 2. In the following description, an upper side in a state shown in FIG. 2 is referred to as an upper side and a side near a negative electrode 2B is referred to as a front in the battery terminal cover 1.

Figure 2:
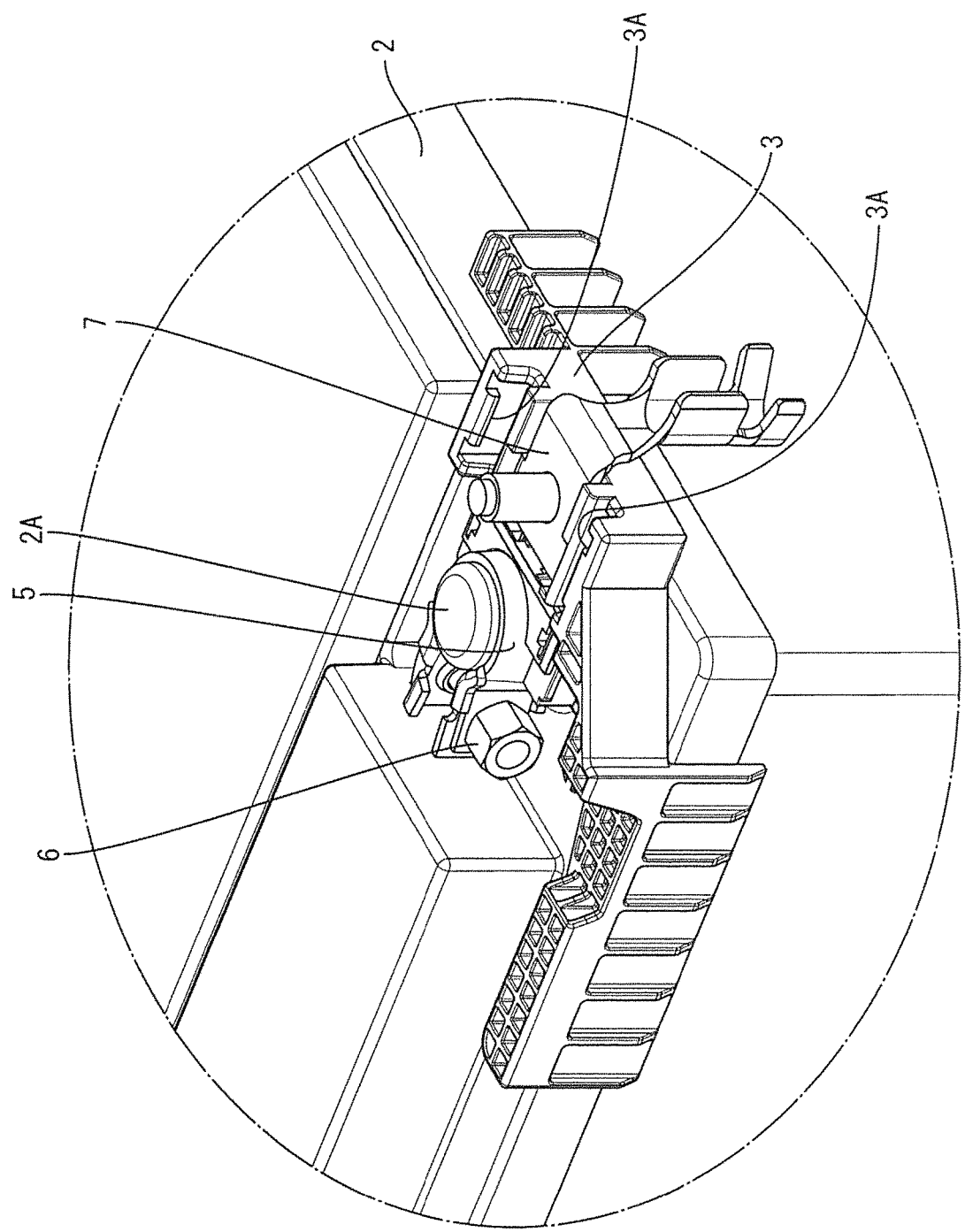
FIG. 2 is a perspective view of a ground terminal group and a battery terminal when viewed from behind.

As shown in FIG. 2, a battery terminal 5, a bolt 6 (screw member) for fixing the battery terminal 5 to the positive electrode 2A and an L-shaped terminal 7 are mounted around the positive electrode 2A. The L-shaped terminal 7 extends from the upper surface to a side surface of the battery terminal 2 to have an L shape. The battery terminal 5 is a long and narrow strip that is wound on the positive electrode 2A. Screw holes are arranged in front of the positive electrode 2A and penetrate near both ends of the battery terminal 5 on the side of the positive electrode 2A. The bolt 6 is screwed into screw holes and an axis thereof is oriented in a lateral direction. A lower part of the L-shaped terminal 7 is caulked and crimped to an unillustrated wire. The L-shaped terminal 7 is positioned with respect to the battery 2 by being fit into a rotation stopping resin component 3.

Figure 3:
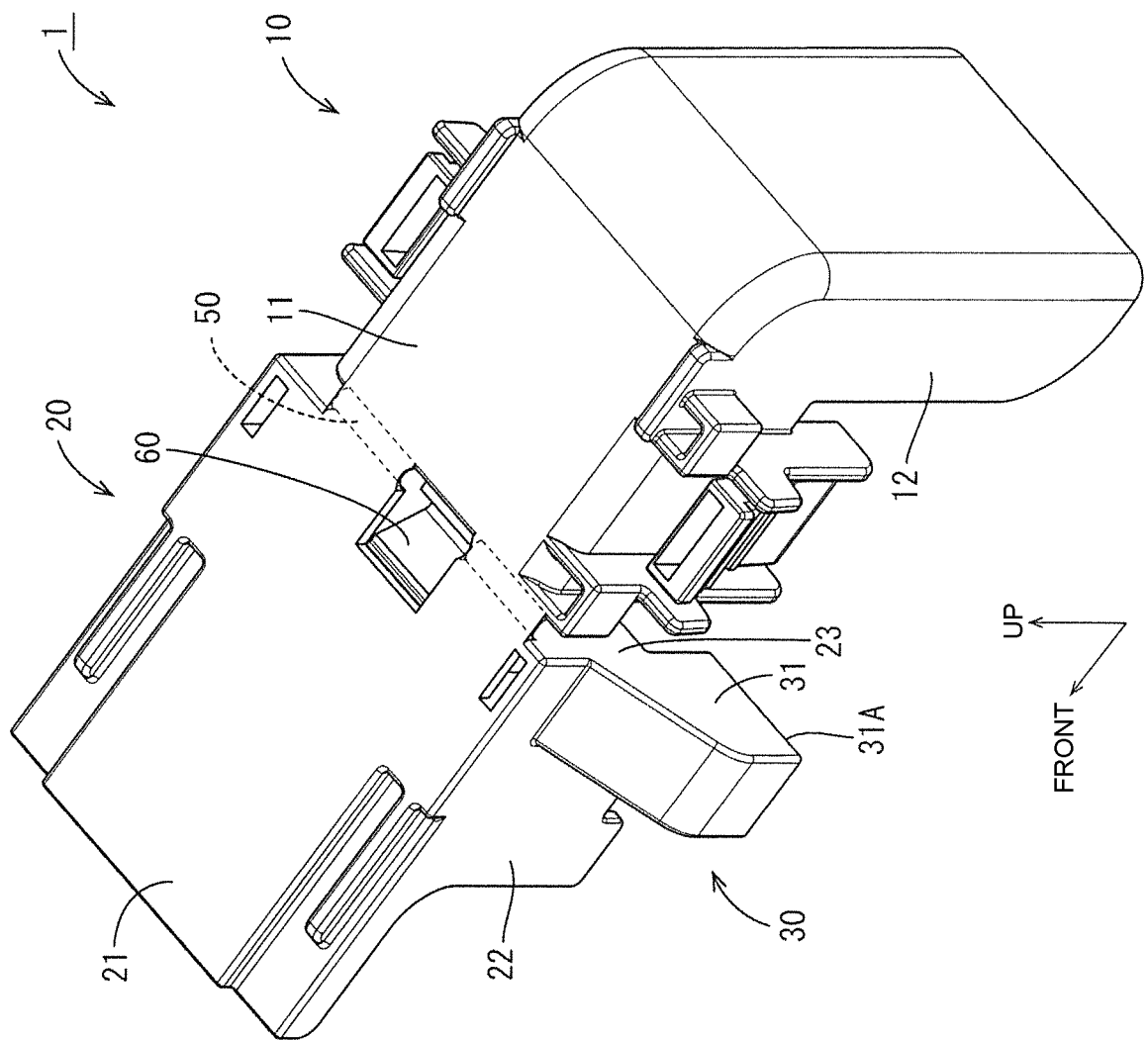
FIG. 3 is a perspective view of the battery terminal cover with a movable portion set at a shielding position when viewed from behind.
Figure 4:
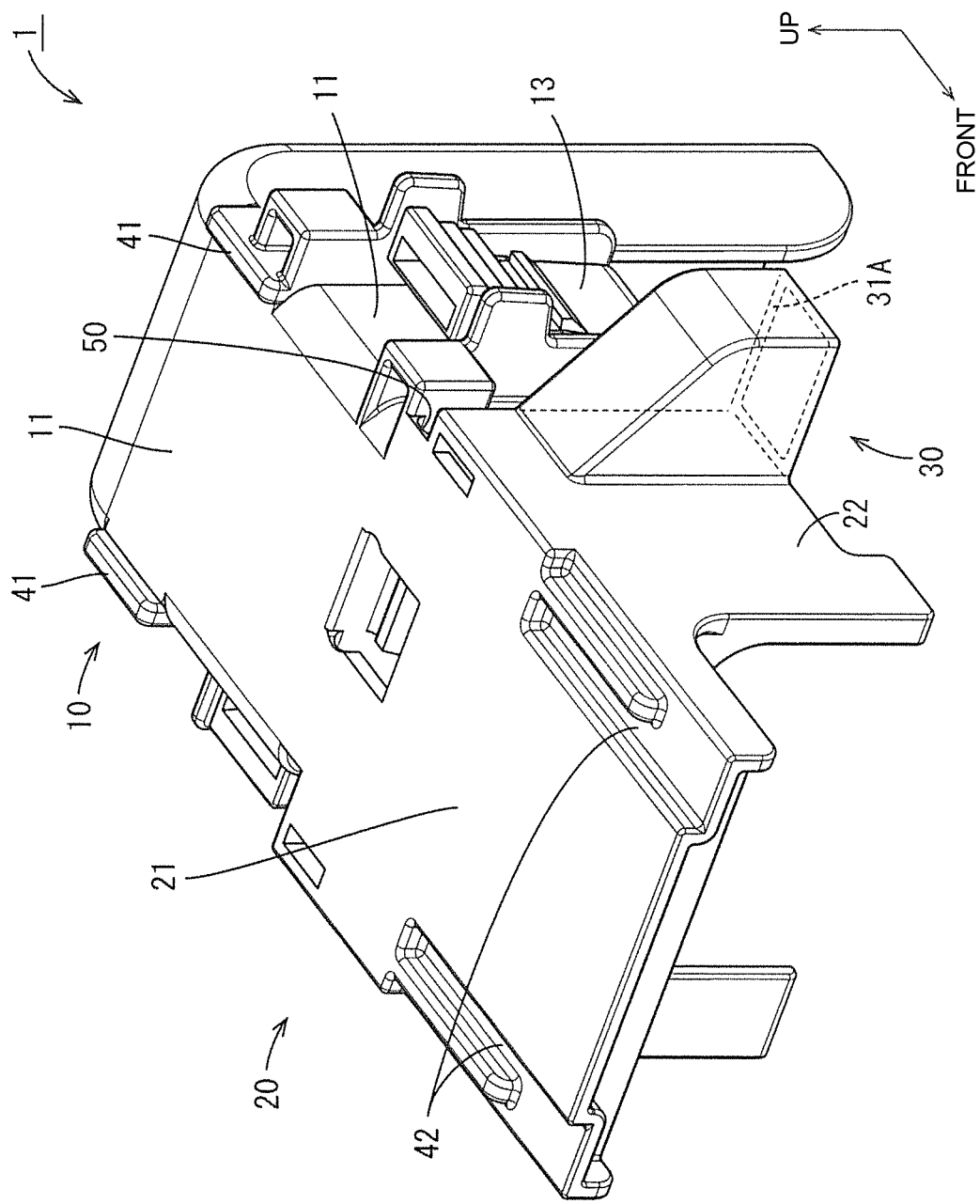
FIG. 4 is a perspective view of the battery terminal cover with the movable portion set at the shielding position when viewed from front.
Figure 5:
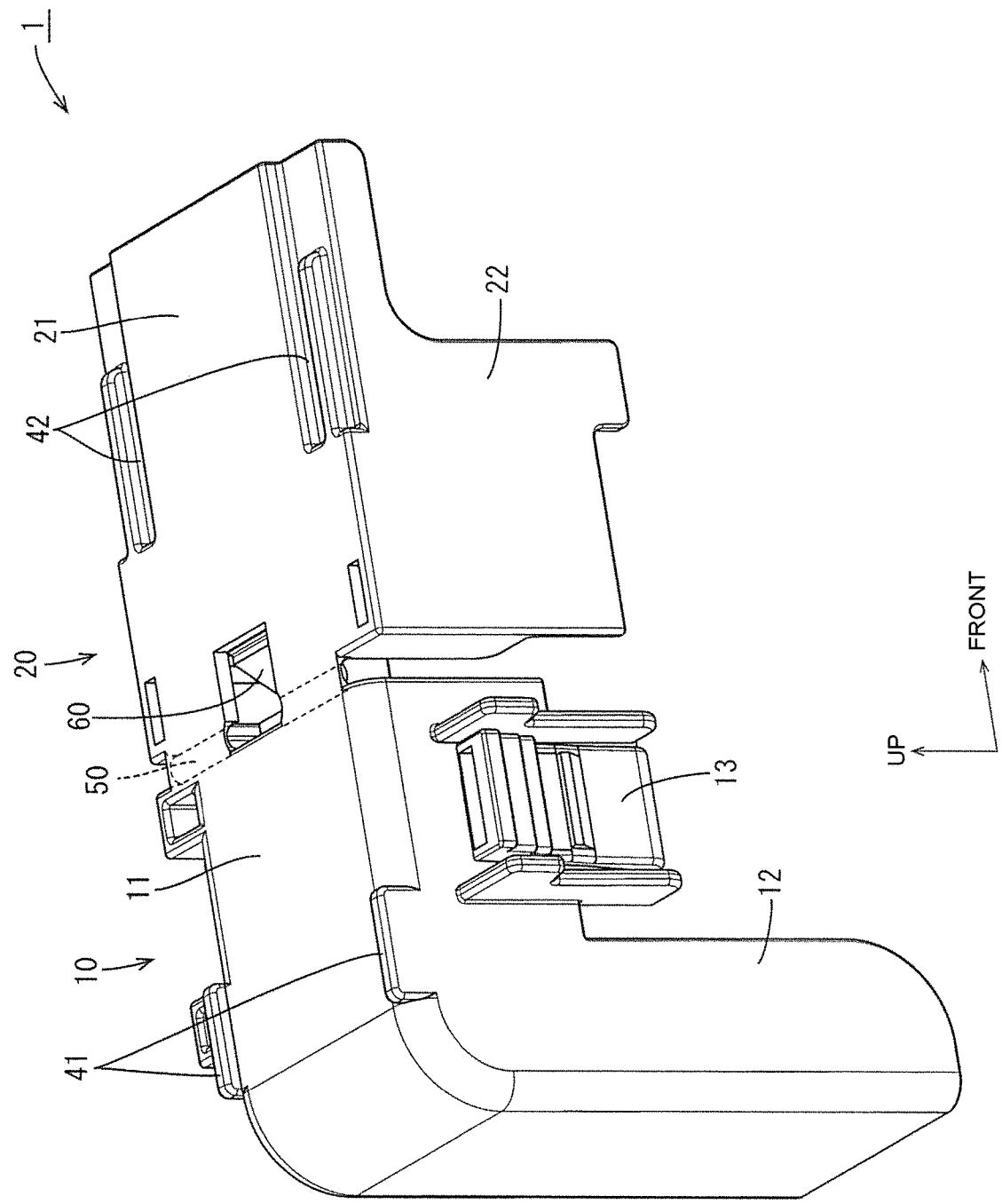
FIG. 5 is a side view of the battery terminal cover with the movable portion set at the shielding position.

The battery terminal cover 1 is divided into two parts across hinges 50 at a substantially half position in a front-rear direction, as shown in FIGS. 3 to 5. In the following description, the part behind the hinges 50 is referred to as a body 10 and the part before the hinges 50 is referred to as a movable portion 20. Further, a part of the body 10 that covers the L-shaped terminal 7 and its periphery from above is referred to as a fixed ceiling plate 11 and parts laterally covering the L-shaped terminal 7 and its periphery are referred to as fixed side plates 12. A part of the movable portion 20 covering the bolt 6 and its periphery from above is referred to as a movable ceiling plate 21 and parts laterally covering the bolt 6 are referred to as movable side plates 22.

Figure 6:
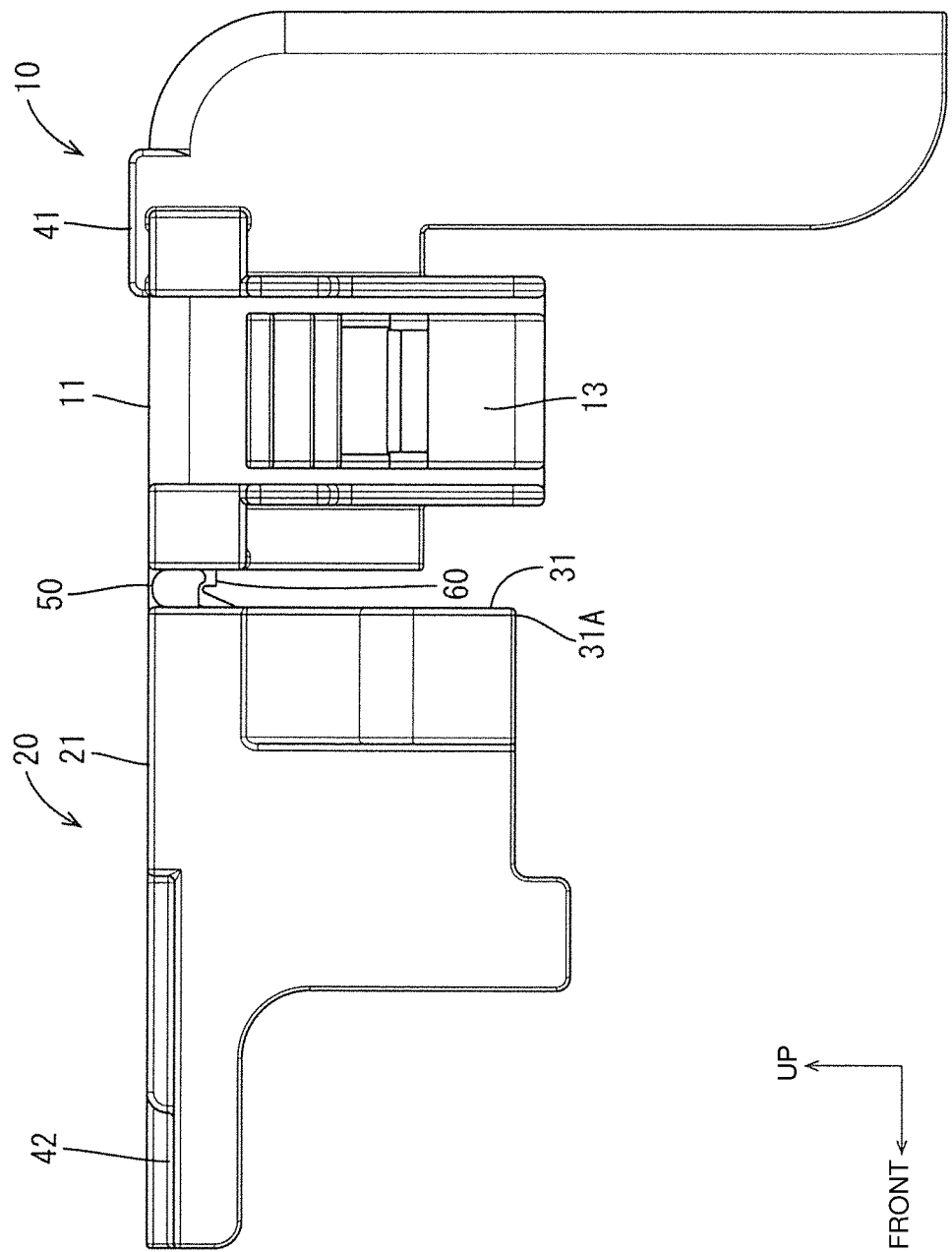
FIG. 6 is a perspective view of the battery terminal cover with the movable portion set at the shielding position when viewed from behind.

The fixed ceiling plate 11 and the movable ceiling plate 21 are coupled by left and right hinges 50 having axes oriented in a lateral direction and a spring 60 is provided between the hinges 50, as shown in FIGS. 3, 5 and 6. The spring 60 has a bent shape to project down. The spring 60 is a reaction force spring and transitions into an extended state and a bent state to leap by biasing an external force due to a resilient force thereof.

As shown in FIGS. 5 and 6, each fixed side plate 12 of the body 10 is substantially L-shaped when viewed laterally. A mounting claw 13 extends down on each fixed side plate 12. As shown in FIG. 1, each fixed side plate 12 is arranged to contact the upper surface and the side surface of the rotation stopping resin component 3 and each mounting claw 13 is fit into a mount receiving portion 3A (see FIG. 2) provided in the rotation stopping resin component 3 so that the body 10 is locked to the rotation stopping resin component 3.

Figure 10:
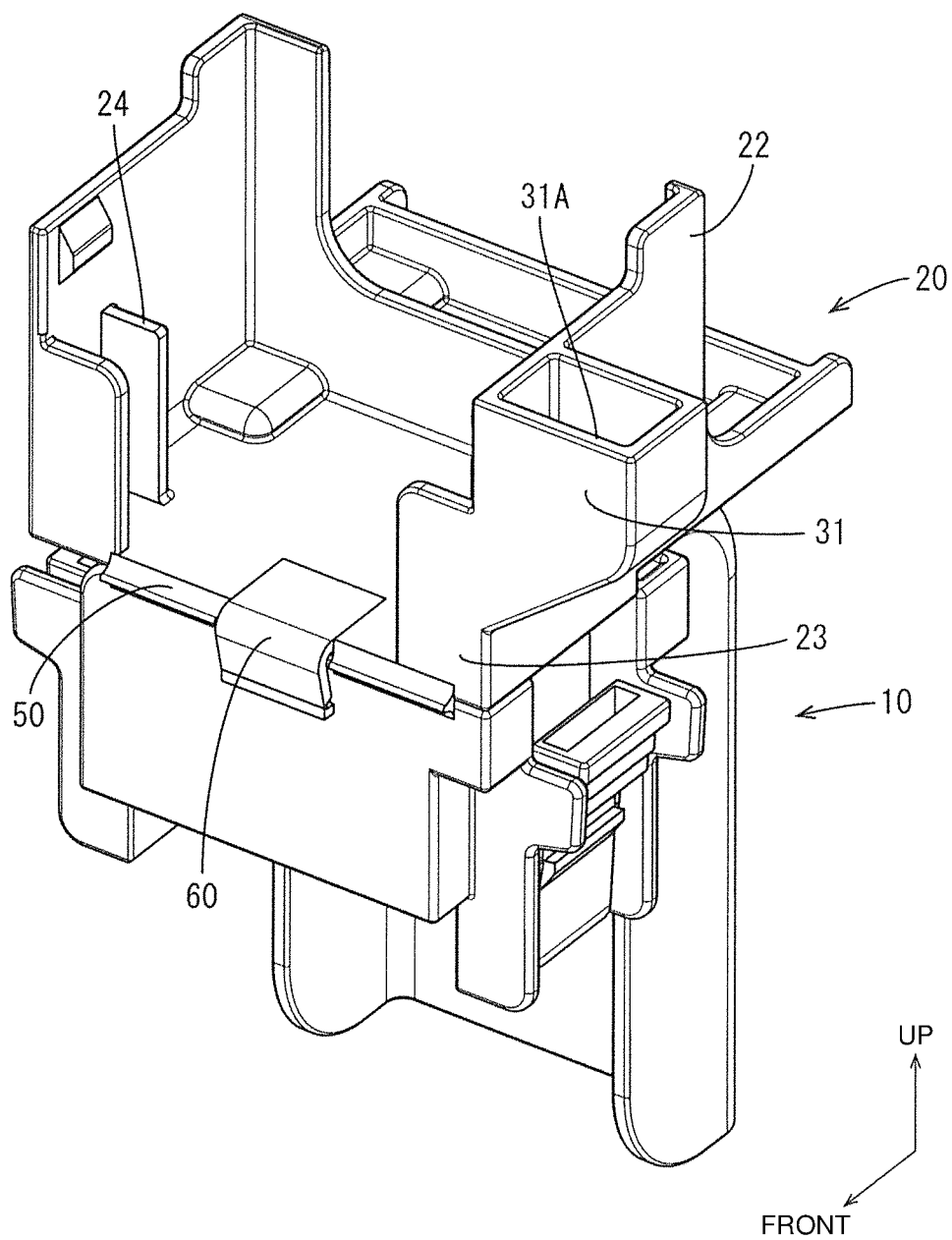
FIG. 10 is a perspective view of the battery terminal cover with the movable portion set at an open position.
Figure 16:
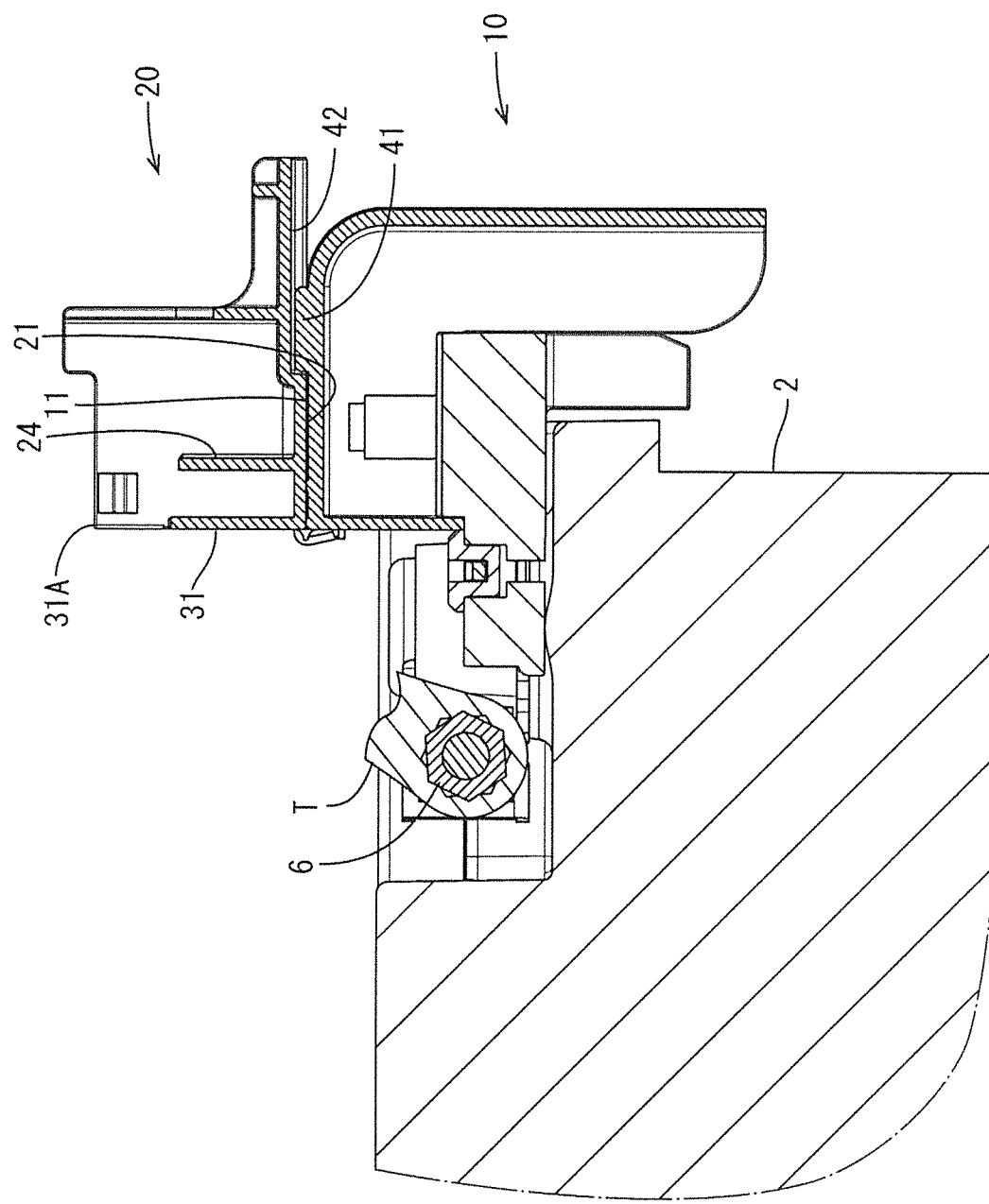
FIG. 16 is a section along A-A of FIG. 14.
Figure 17:
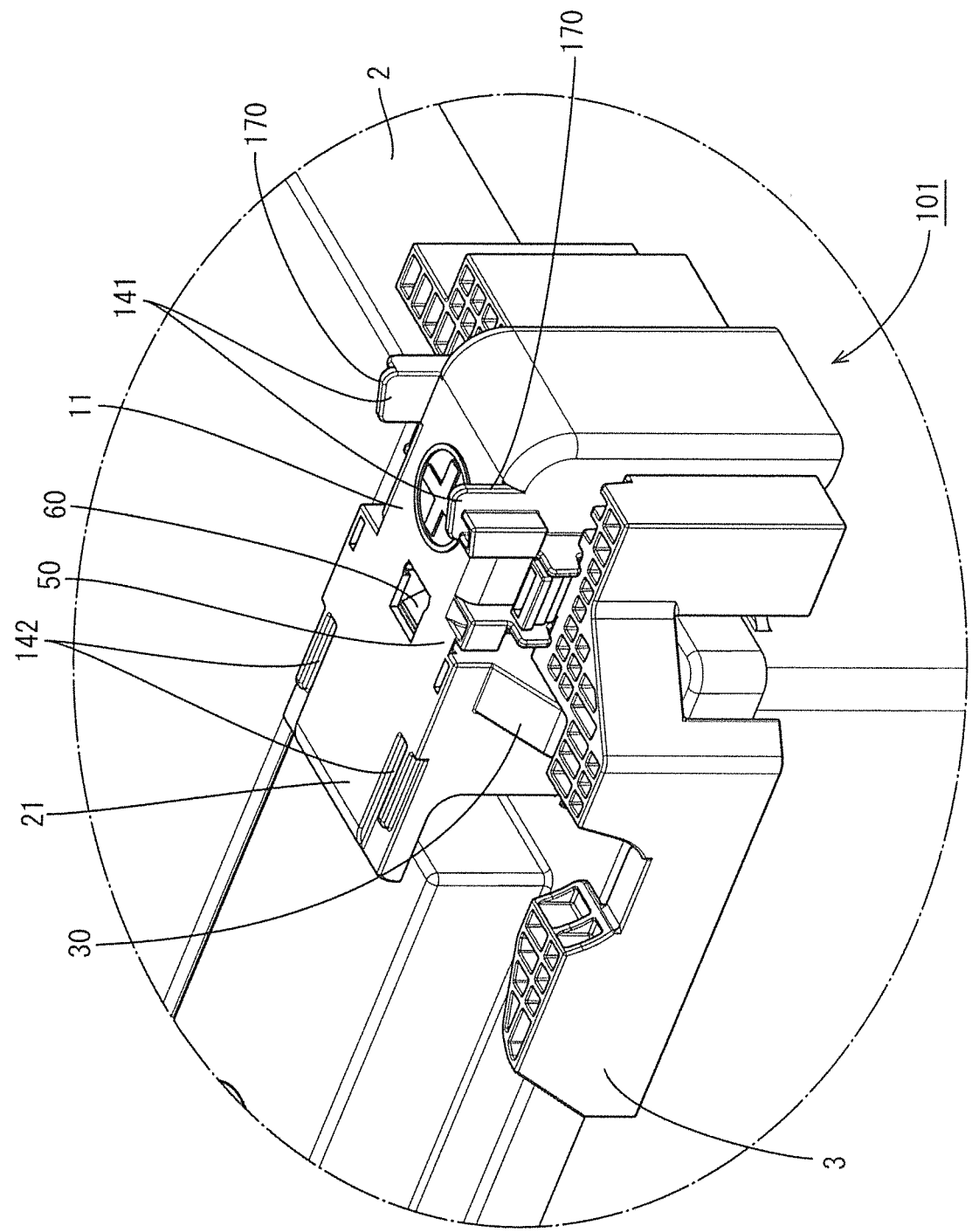
FIG. 17 is a perspective view of a battery terminal cover of a second embodiment when viewed from behind.
Figure 18:
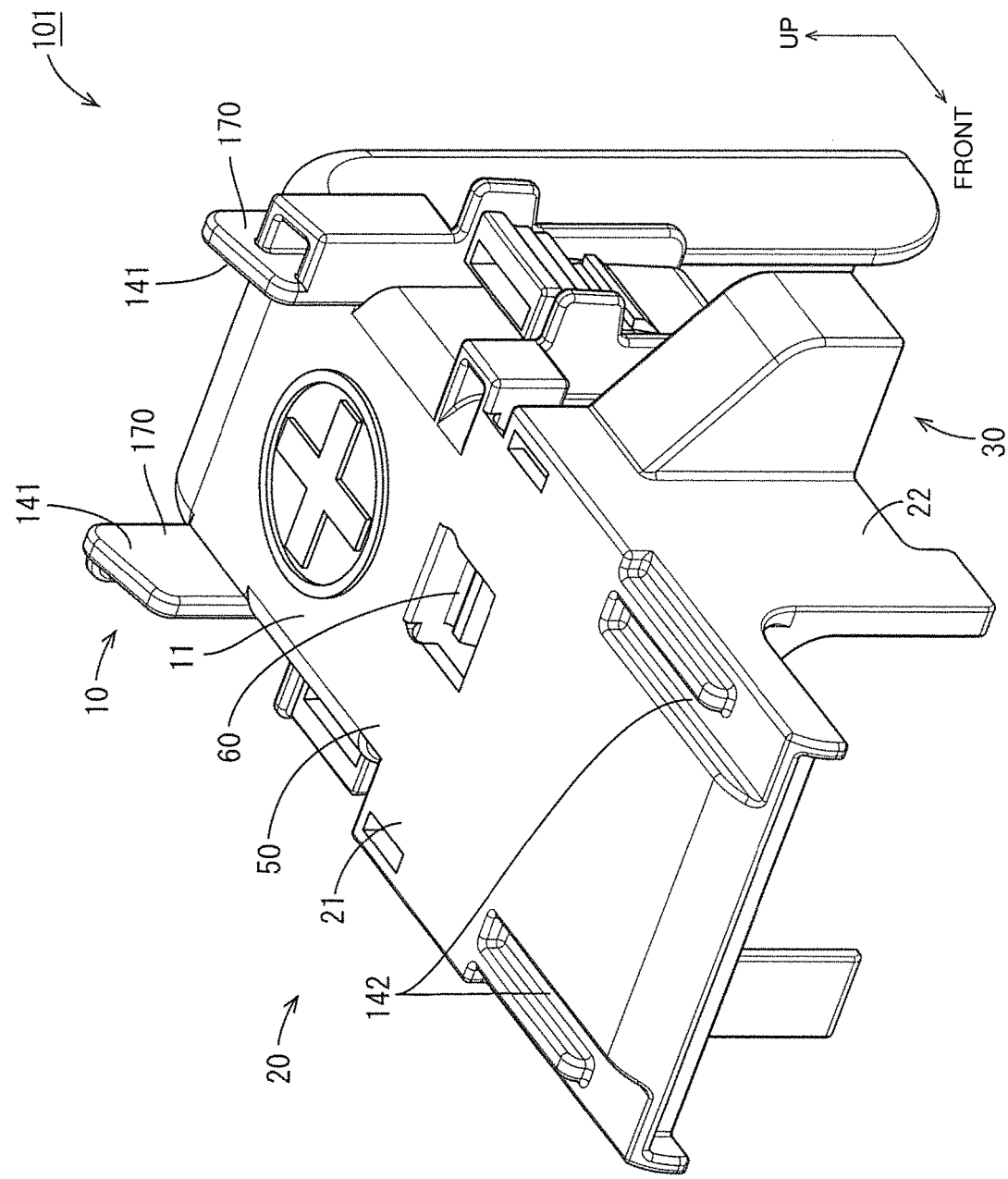
FIG. 18 is a perspective view of the battery terminal cover with a movable portion set at a shielding position when viewed from front.

The movable portion 20 can be arranged at a shielding position where the bolt 6 is covered, as shown in FIG. 1, and at an open position where the bolt 6 can be exposed to the outside, as shown in FIG. 10, by a biasing force of the spring 60. With the movable portion 20 set at the open position, the movable ceiling plate 21 is in surface contact with the fixed ceiling plate 11, as shown in FIG. 16, and the movable side plates 22 project in a direction separating from the fixed ceiling plate 11. At the time of maintenance, such as an exchange for the battery 2, the movable portion 20 is at the open position to expose the bolt 6 and the bolt 6 can be screwed or unscrewed using a tool T.

A relatively large torque is necessary to screw the bolt 6. Thus, the tool T has a long handle in many cases. However, if a handle of such a tool T is rotated about the bolt 6 in a vehicle C, the tip of the tool T may contact the vehicle C and damage the vehicle C.

Accordingly, the battery terminal cover 1 has a tool restricting portion 30 projecting into a rotation locus extending until the tool T contacts the vehicle C and is configured to restrict the rotation of the tool T by interfering with the tool T before the tool T contacts the vehicle C.

Figure 7:
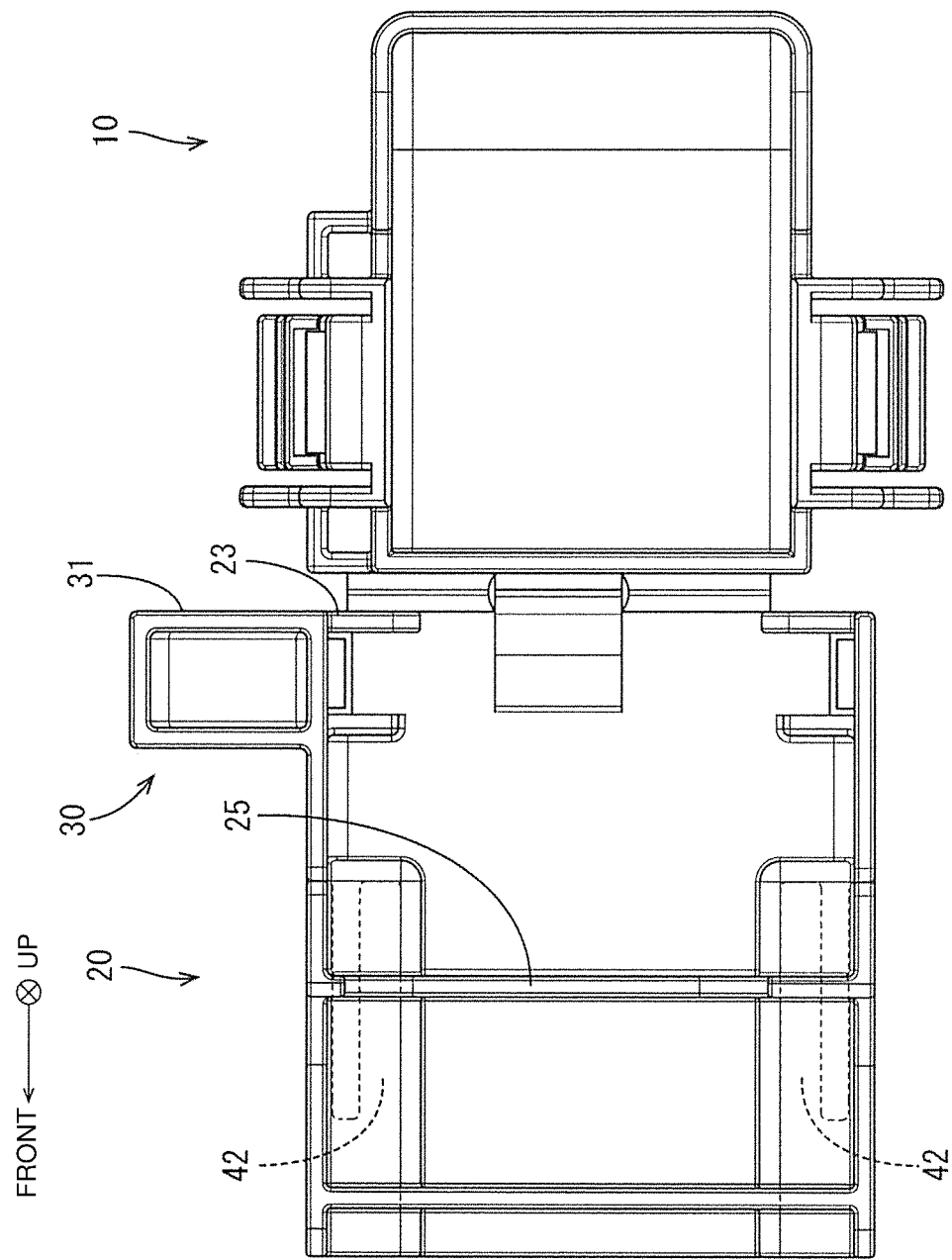
FIG. 7 is a bottom view of the battery terminal cover with the movable portion set at the shielding position.
Figure 8:
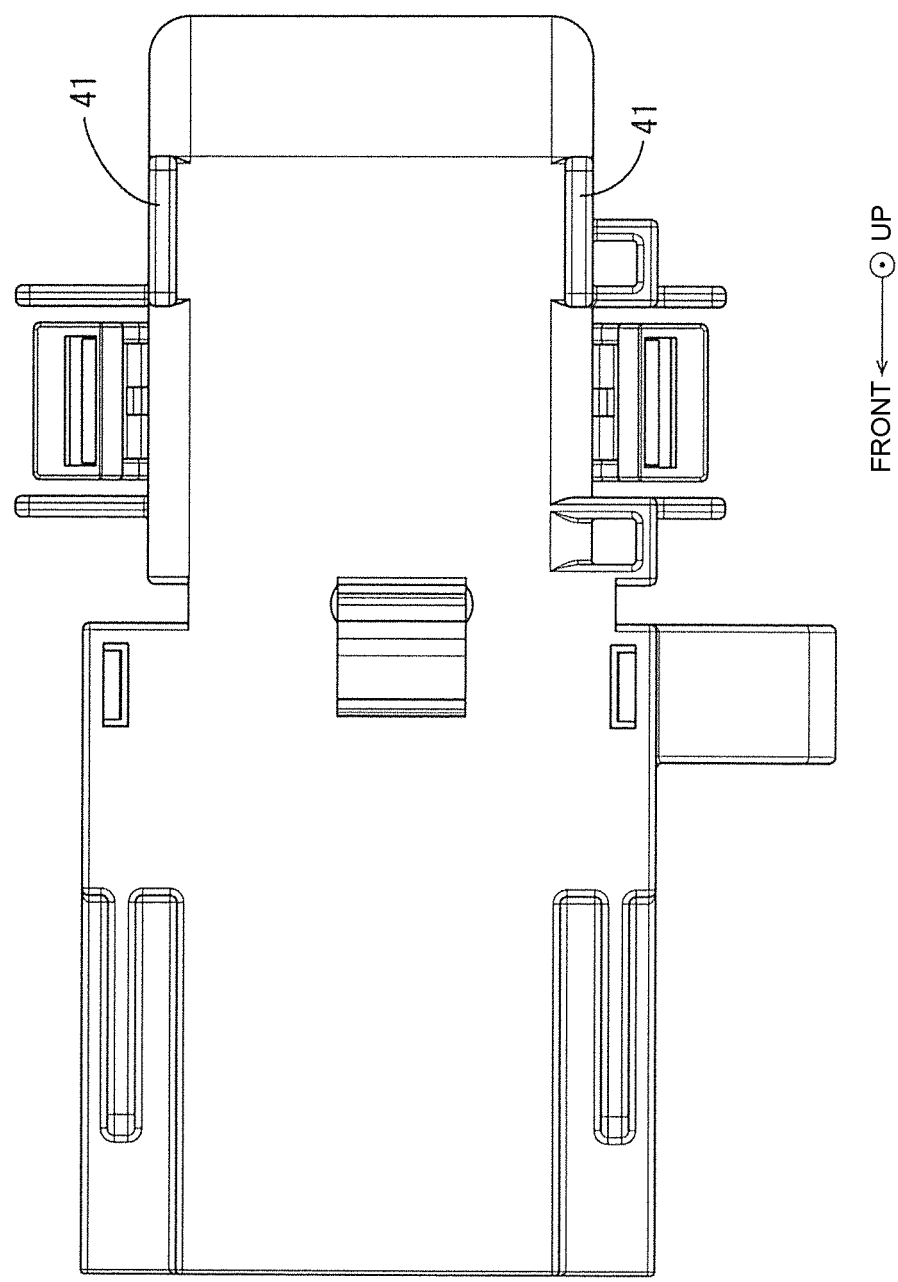
FIG. 8 is a plan view of the battery terminal cover with the movable portion set at the shielding position.
Figure 9:
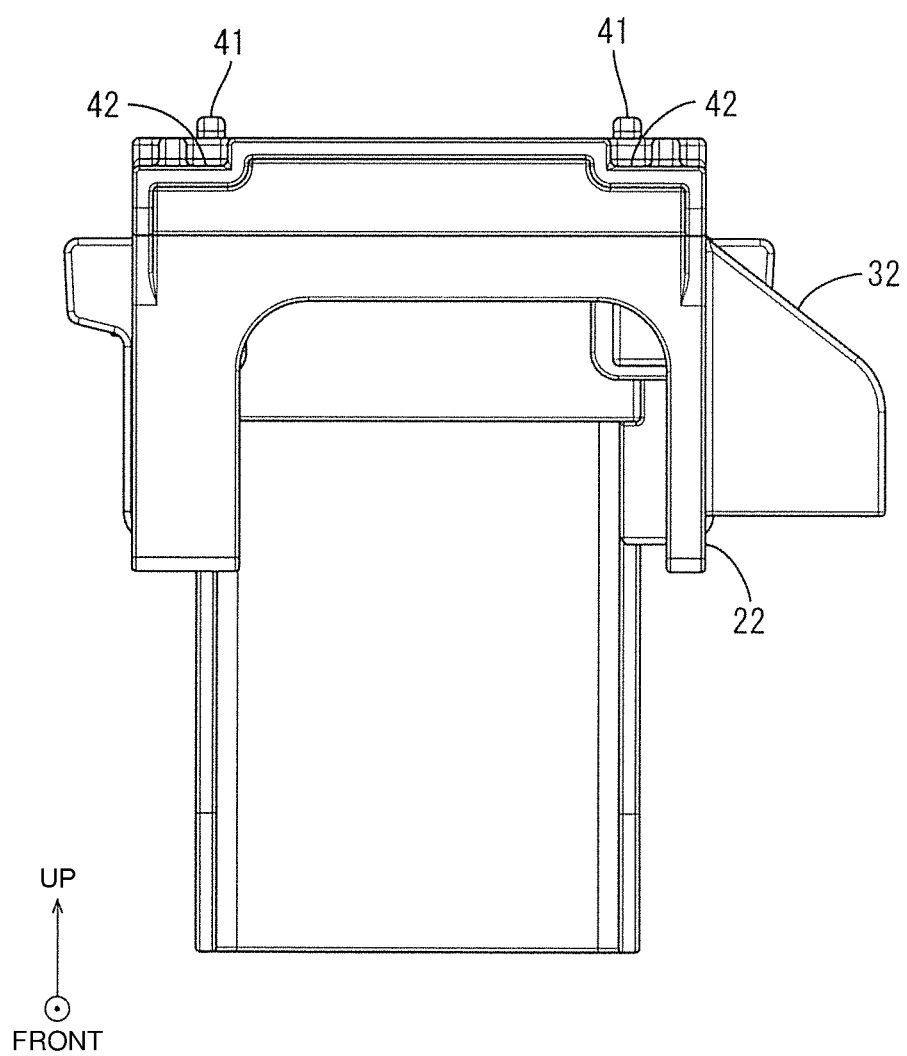
FIG. 9 is a front view of the battery terminal cover with the movable portion set at the shielding position.

The tool restricting portion 30 extends toward an outer surface side of one of the movable side plates 22, as shown in FIGS. 3 and 4, and has a box shape open down, as shown in FIG. 7. A rear wall 31 of the tool restricting portion 30 is flush with a back plate 23 provided on the rear end of the movable portion 20, as shown in FIGS. 3 and 7. A lower end 31A of the rear wall 31 is flush with the lower end (upper end in a state of FIG. 10) of the movable side plate 22, as shown in FIGS. 4 and 10. A ceiling wall 32 of the tool restricting portion 30 extends obliquely down at an angle of about 45° with respect to the movable side plate 22, as shown in FIG. 9. A lower end part of the rear wall 31 of the tool restricting portion 30 is referred to below as a rotation restricting end 31A.

In the state shown in FIG. 1 where the movable portion 20 is at the shielding position, the tool restricting portion 30 is accommodated with the rotation restricting end 31A fit between the battery terminal 5 and the rotation stopping resin component 3.

Figure 13:
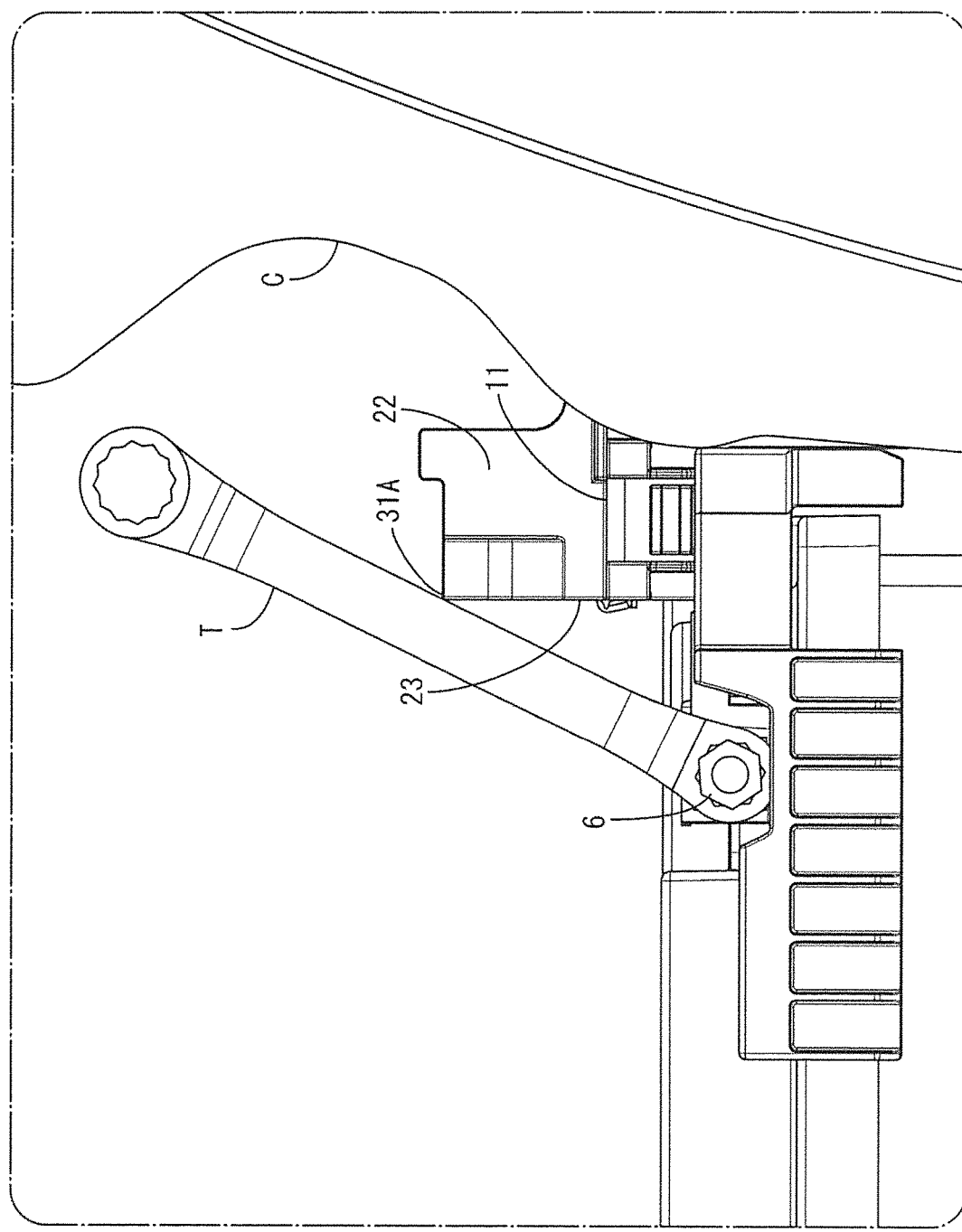
FIG. 13 is a side view showing a state where a tool is being used in a vehicle.

With the movable portion 20 set at the open position, the rotation restricting end 31A is above the front end of the fixed ceiling plate 11, as shown in FIG. 13. If the tool T is rotated about the bolt 6 in this state, the rotation restricting end 31A interferes with the handle of the tool T to restrict further rotation. A pressing force received by the rotation restricting end 31A from the tool T is transferred to the movable ceiling plate 21 mainly via the movable side plate 22 and the back plate 23 and is transferred to the body 10 via the movable ceiling plate 21.

Figure 11:
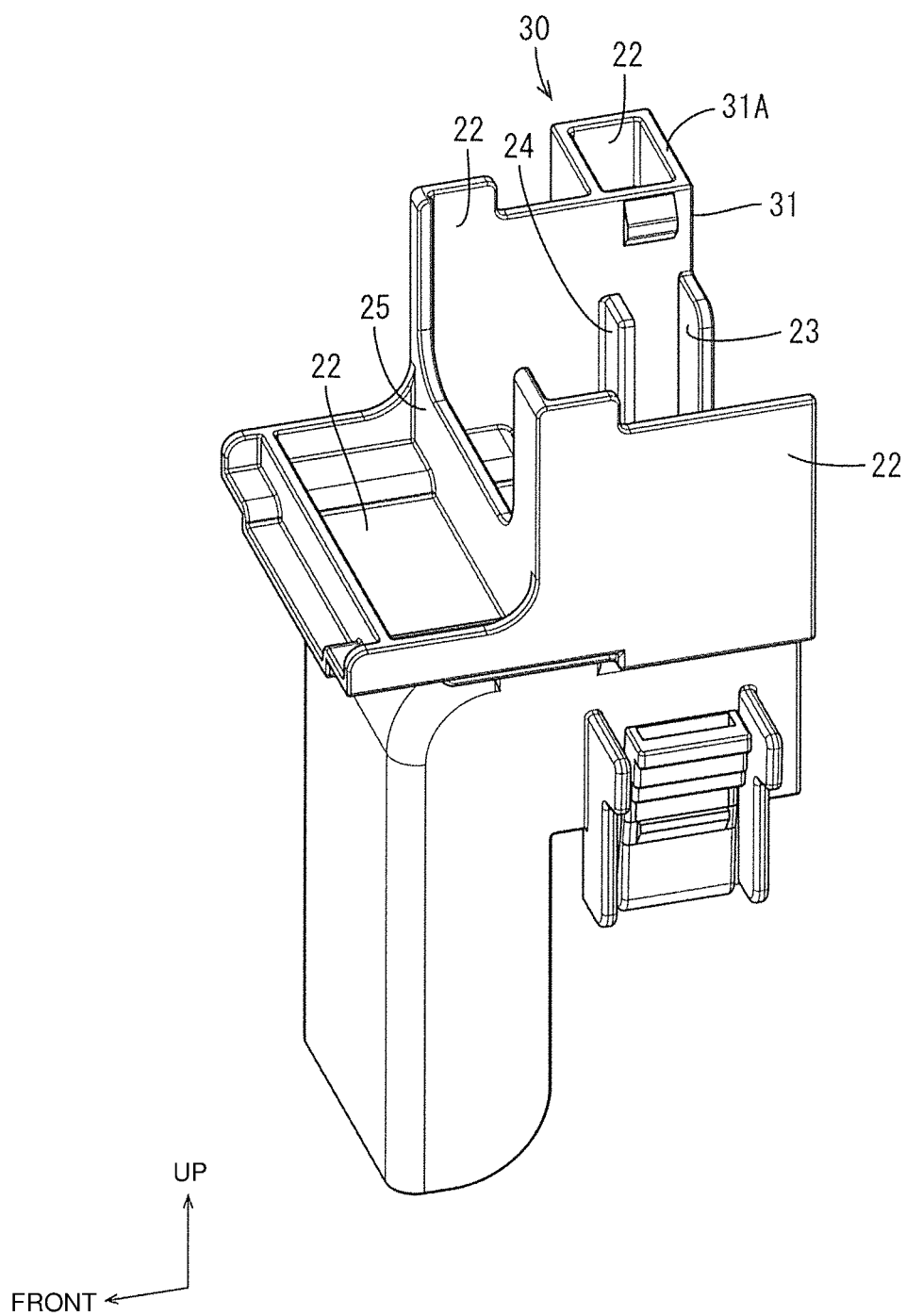
FIG. 11 is a perspective view of the battery terminal cover with the movable portion set at the open position.
Figure 12:
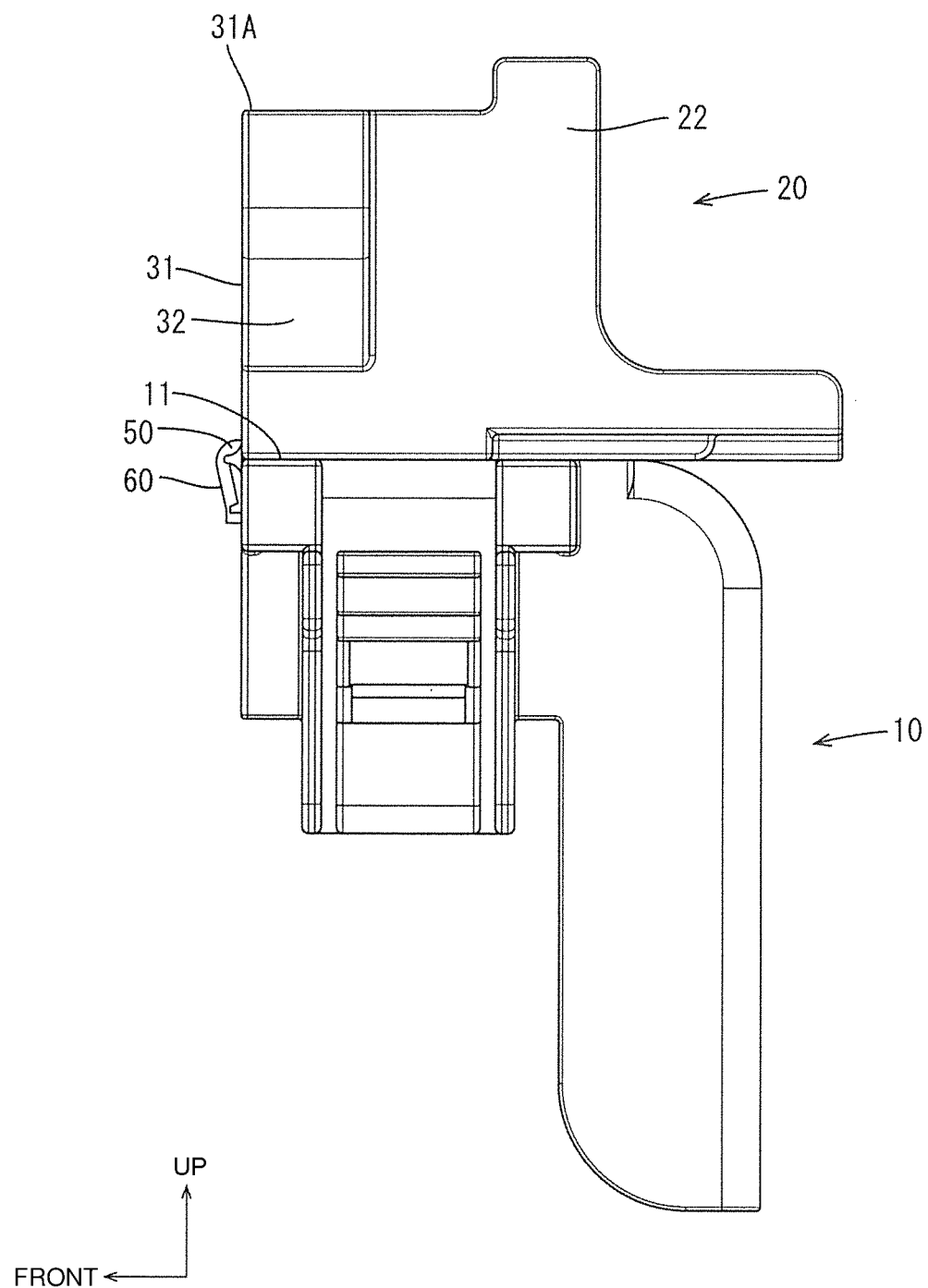
FIG. 12 is a side view of the battery terminal cover with the movable portion set at the open position.

Note that left and right auxiliary ribs 24 are provided in parallel to the back plate 23 on inner sides of the movable side plates 22, as shown in FIGS. 10 and 11. As shown in FIG. 10, one end of the auxiliary rib 24 is coupled to the movable side plate 22 and the lower end thereof is coupled to the movable ceiling plate 21. In this way, the auxiliary rib 24 supports the movable side plate 22 from the inner side to prevent deflection and deformation of the movable side plate 22.

Figure 14:
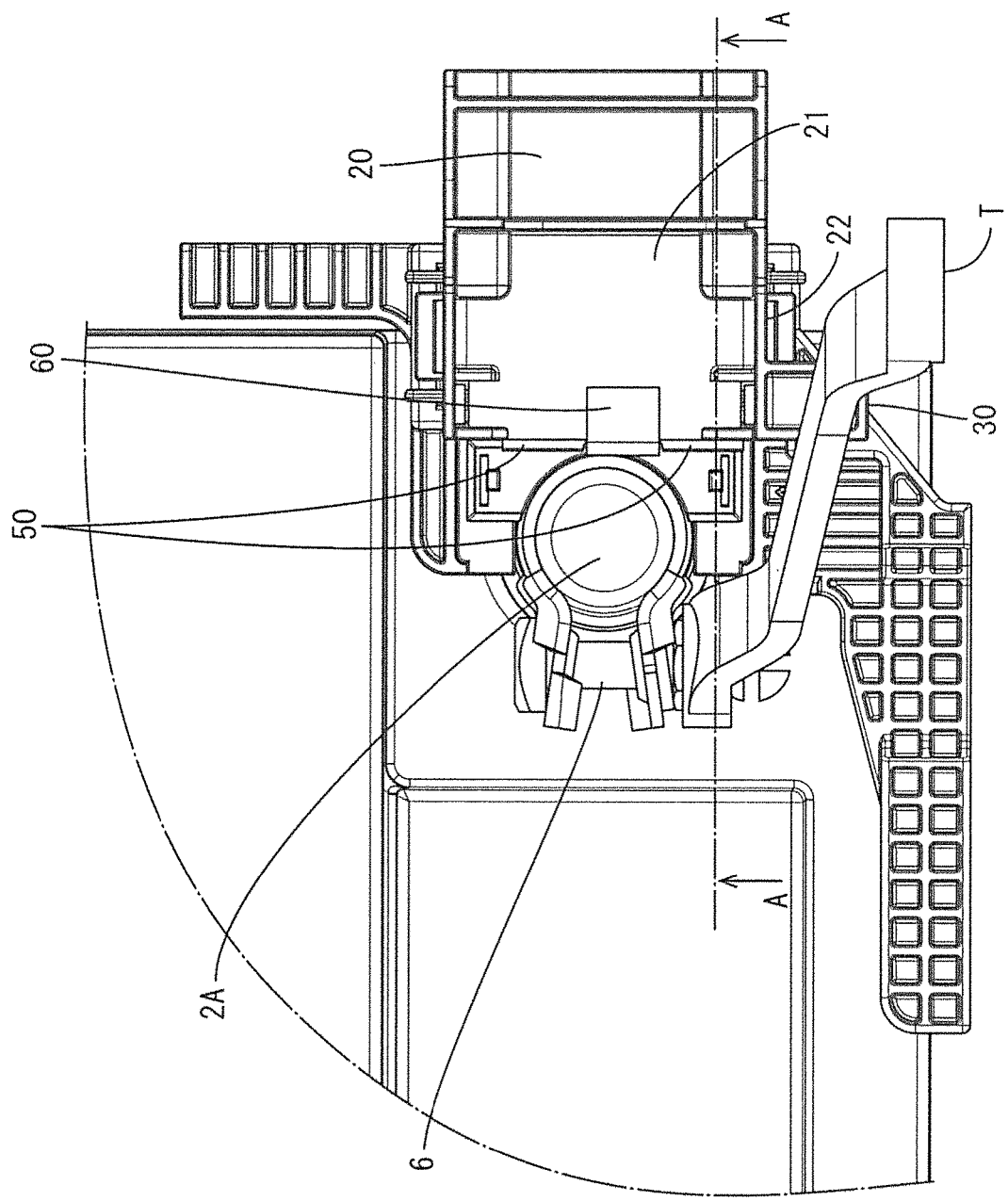
FIG. 14 is a front view showing the state where the tool is being used in the vehicle.
Figure 15:
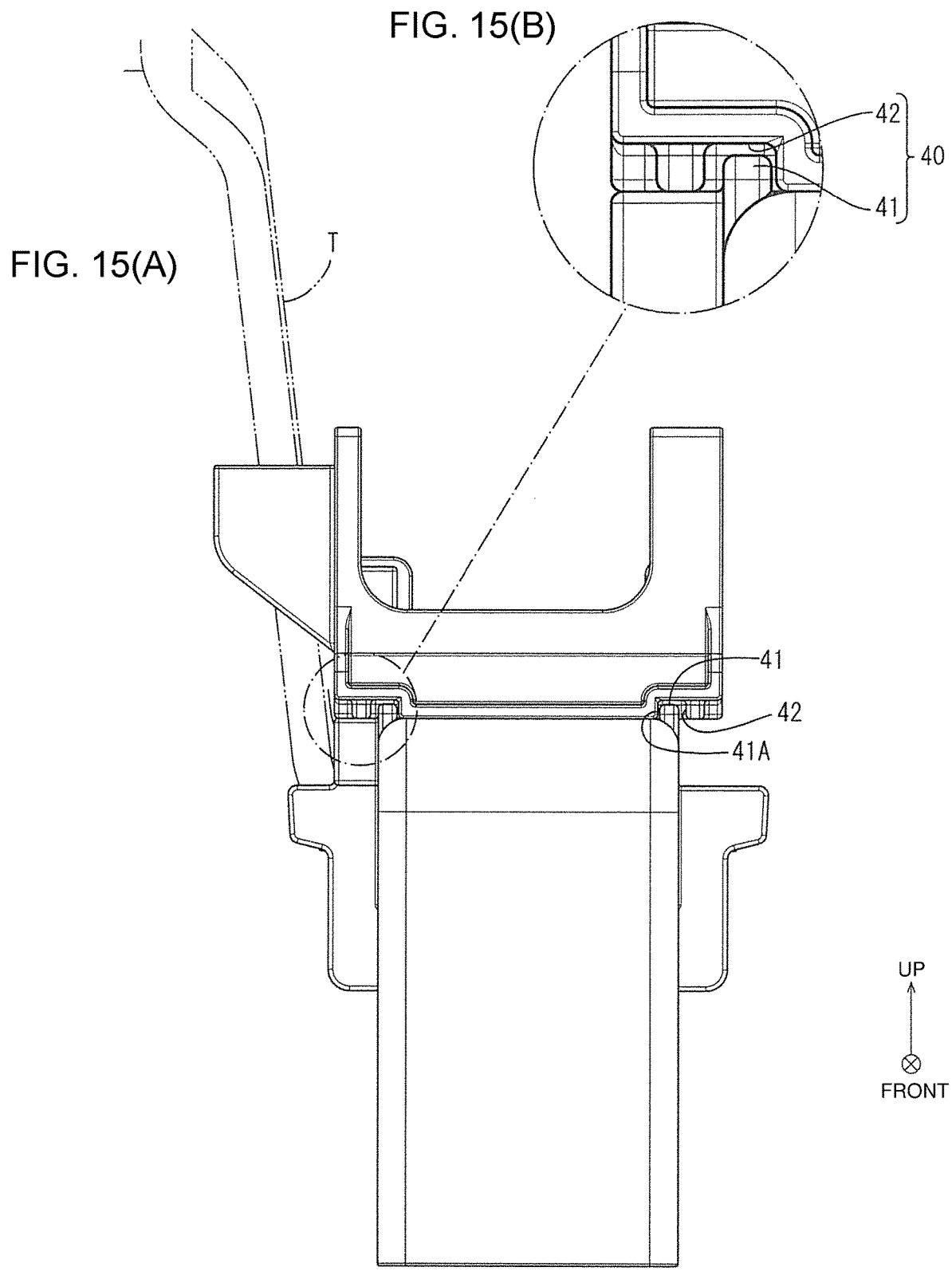
FIG. 15A is a back view showing a state where the tool is being used and FIG. 15B is an enlarged back view of the circled region in FIG. 15A.

An operation of rotating the bolt 6 is performed in the vehicle with a limited space, and a tool T bent from a head to a handle (so-called offset type) as shown in FIG. 14 may be used. Assuming this in this embodiment, the tool restricting portion 30 is provided at a laterally outer side of the movable side plate 22 (i.e. at a position projected farther in an axial direction of the hinges 50 than the movable portion 20) as described above.

In this configuration, the tool T contacts and presses the rotation restricting end 31A at the laterally outer side of the movable side plate 22, as shown in FIGS. 14 and 15(A). Thus, a pressing force acts to displace laterally the movable ceiling plate 21. Further, the hinges 50 are strips of synthetic resin and may be deformed by an external force. Accordingly, the movable ceiling plate 21 may laterally displace to rotate about the hinges 50 by the pressing force from the tool T, and the tool restricting portion 30 may deviate from a desired position to allow the tool T to contact the vehicle C.

To prevent such contact, the battery terminal cover 1 has a lateral displacement restricting portion 40 for restricting a lateral displacement of the movable ceiling plate 21, as shown in FIGS. 15(A) and 15(B). The lateral displacement restricting portion 40 has left and right lateral displacement restricting ribs 41 on the fixed ceiling plate 11 and left and right lateral displacement restricting recesses 42 provided in the movable ceiling plate 21.

The lateral displacement restricting ribs 41 project up on both lateral ends of the fixed ceiling plate 11, as shown in FIG. 4, and extend in the front-rear direction from the rear end position of each mounting claw 13 to the rear end of the fixed ceiling plate 11, as shown in FIG. 5.

As shown in FIG. 4, the lateral displacement restricting recesses 42 are formed by recessing areas of the movable ceiling plate 21 near both lateral ends and extending down from a position before the tool restricting portion 30 to the front end. The movable ceiling plate 21 has a reinforcing wall 25 coupling the left and right movable side plates 22, as shown in FIG. 11, and the reinforcing wall 25 intersects the both lateral displacement restricting recesses 42 when viewed from below through the lower surface, as shown in FIG. 7.

As shown in FIG. 15(B), a width (lateral dimension) of the lateral displacement restricting rib 41 is set to fit into the lateral displacement restricting recess 42. A projecting height of the lateral displacement restricting rib 41 from the fixed ceiling plate 11 is equal to or shorter than a depth of the lateral displacement restricting recess 42. In this way, at the open position of the movable portion 20, the lateral displacement restricting ribs 41 are fit into the lateral displacement restricting recesses 42 and lock to the lateral displacement restricting recesses 42, as shown in FIG. 15(B), and the movable ceiling plate 21 is in surface contact with the fixed ceiling plate 11, as shown in FIG. 16.

If the movable portion 20 is going to be laterally displaced with respect to the body portion 10 by a pressing force transferred from the tool T to the tool restricting portion 30, the lateral displacement restricting recesses 42 are locked to the lateral displacement restricting ribs 41 to restrict lateral displacement of the movable portion 20.

As described above, the battery terminal cover 1 is mounted on the battery 2 to be installed in the vehicle and includes the body 10 to be fixed to the battery 2, the movable portion 20 coupled to the body 10 via the hinges 50 and rotationally displaceable to the shielding position to cover the screw member (bolt 6) mounted on the battery 2 and the open position to be overlapped on the body 10, and the tool restricting portion 30 provided on the movable portion 20 and configured to restrict the rotation of the tool T by interfering with the tool T before the tool T rotated about the screw member 6 contacts the vehicle C with the movable portion 20 set at the open position. According to this configuration, the tool T rotated about the screw member 6 contacts the tool restricting portion 30 to restrict any further rotation. Thus, the tool T cannot contact and damage the vehicle C.

The body 10 includes the fixed ceiling plate 11 coupled to the hinges 50, the movable portion 20 includes the movable ceiling plate 21 coupled to the hinges 50, the tool restricting portion 30 projected farther in the axial direction of the hinges 50 than the movable portion 20, and at least one of the movable ceiling plate 21 and the fixed ceiling plate 11 includes the lateral displacement restricting portion 40 lockable to the other when the movable portion 20 is at the open position.

Since the tool restricting portion 30 projects farther in the axial direction of the hinges 50 than the movable portion 20 in this configuration, a pressing force from the tool T may be transferred from the tool restricting portion 30 to the movable portion 20 and may act in the direction to rotationally displace the movable portion 20 about the hinges 50 and the movable portion 20 may be displaced from the body 10. However, according to this configuration, the lateral displacement restricting portion 40 on at least one of the movable ceiling plate 21 and the fixed ceiling plate 11 is locked to the other. Thus, a lateral displacement of the movable portion 20 is restricted. In this way, the rotation of the tool T can be reliably restricted by preventing a displacement of the tool restricting portion 30.

Further, the movable portion 20 includes the movable side plates 22 projecting in the direction separating from the body 10 at the open position, and the tool restricting portion 30 is provided on the movable side plate 22. According to this configuration, the tool restricting portion 30 is separated from the body 10 according to the projecting height of the movable side plate 22 when the movable portion 20 is at the open position, the tool restricting portion 30 can be arranged at a desired position in a height direction from the body 10.

A second embodiment is described with reference to FIGS. 17 to 23. A battery terminal cover 101 of the second embodiment differs from that of the first embodiment in that angle setting portions 170 are provided at the same positions as the lateral displacement restricting ribs 41 of the first embodiment to support a movable ceiling plate 21 at an acute angle to a fixed ceiling plate 11 and projecting end parts of the angle setting portions 170 double as lateral displacement restricting ribs 141. Components corresponding to those of the first embodiment are denoted by the reference signs of the first embodiment plus 100. The same configuration, functions and effects as those of the first embodiment are not described and the same components as those of the first embodiment are denoted by the same reference sings.

Figure 19:
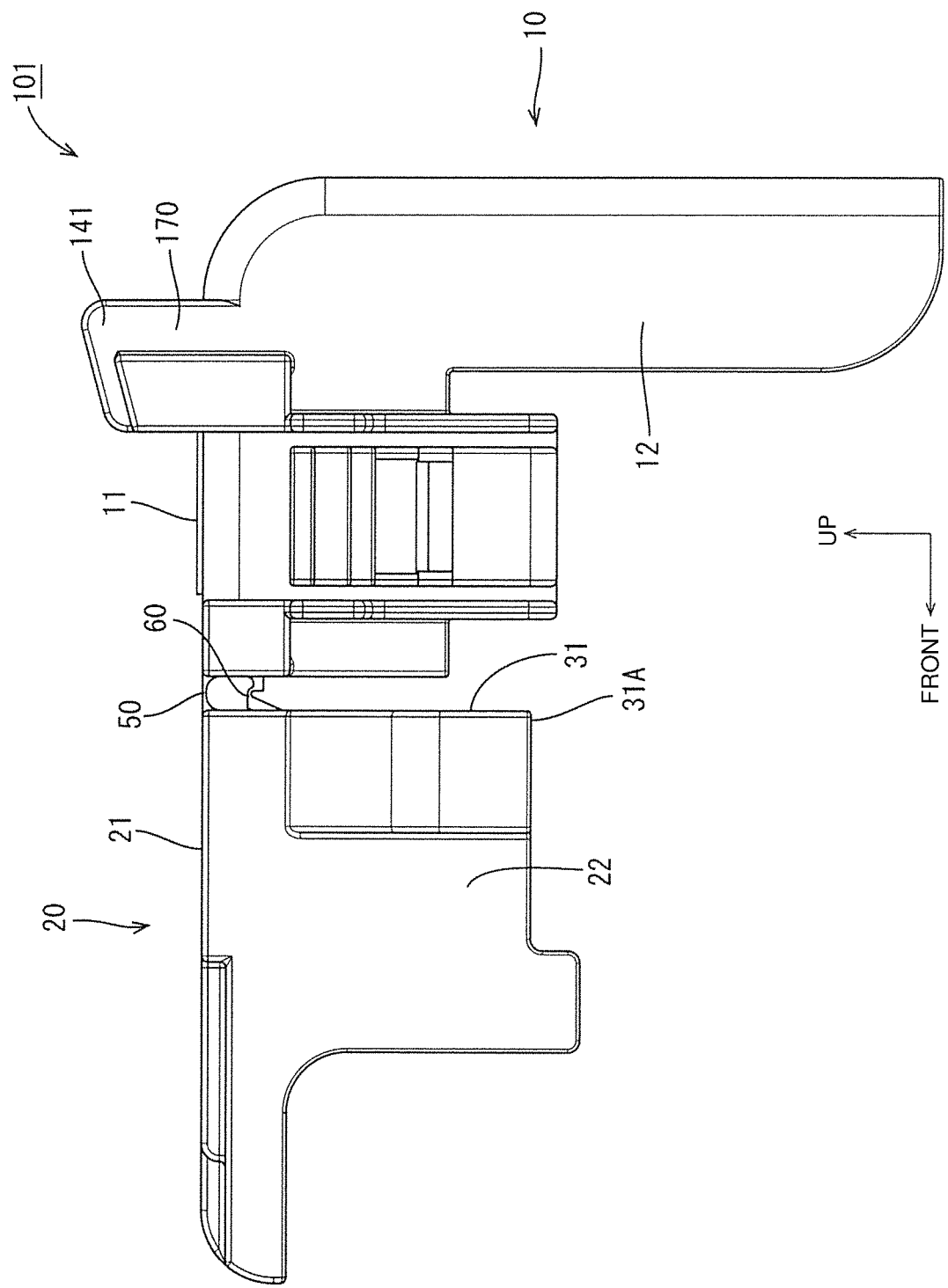
FIG. 19 is a side view of the battery terminal cover with the movable portion set at the shielding position.
Figure 20:
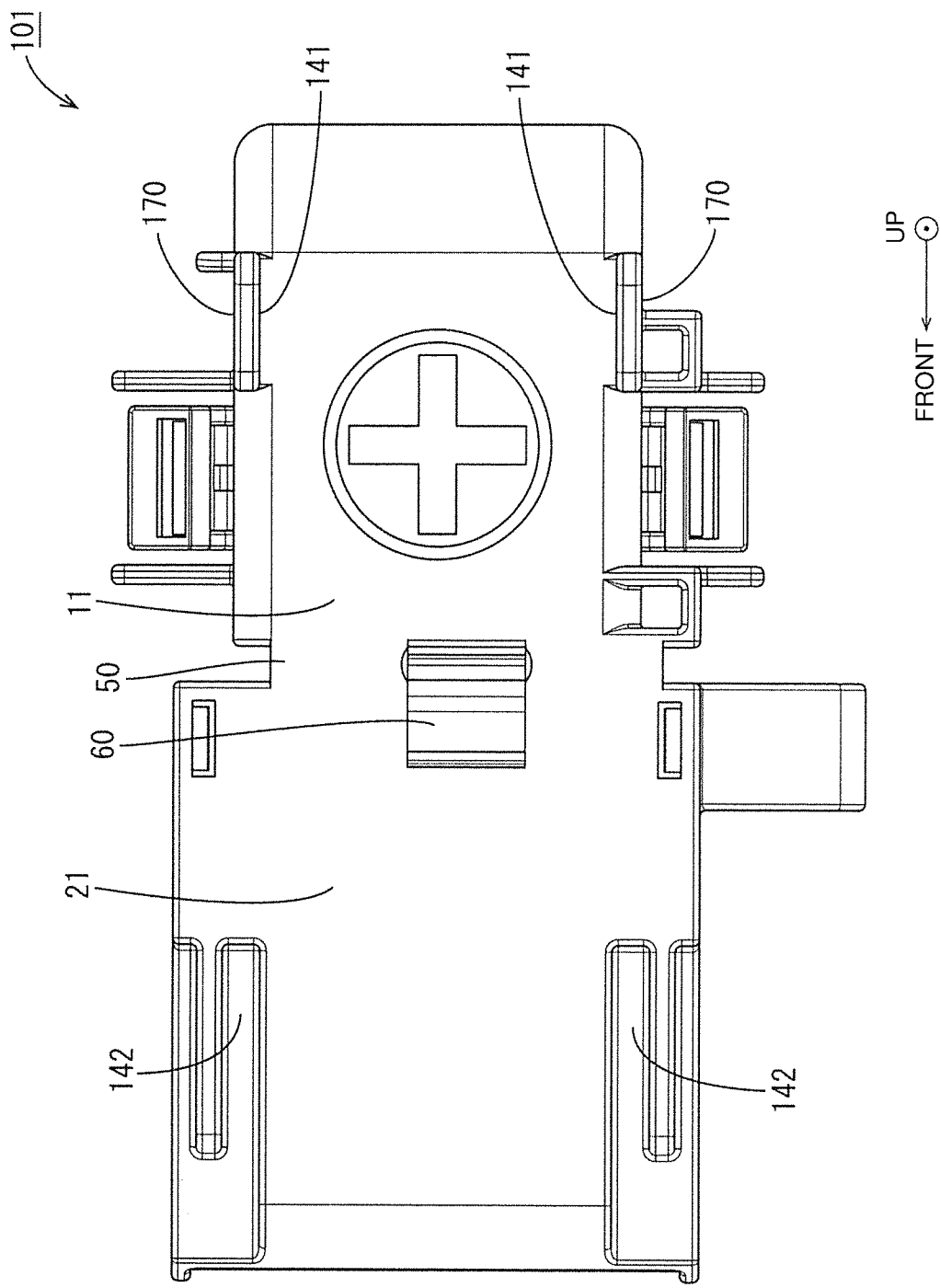
FIG. 20 is a plan view of the battery terminal cover with the movable portion set at the shielding position.

The angle setting portion 170 is shaped to project farther up than the lateral displacement restricting rib 41 of the first embodiment, as shown in FIG. 19, and the upper surface thereof is tapered with a front side higher than a rear side, as shown in FIG. 19.

Figure 21:
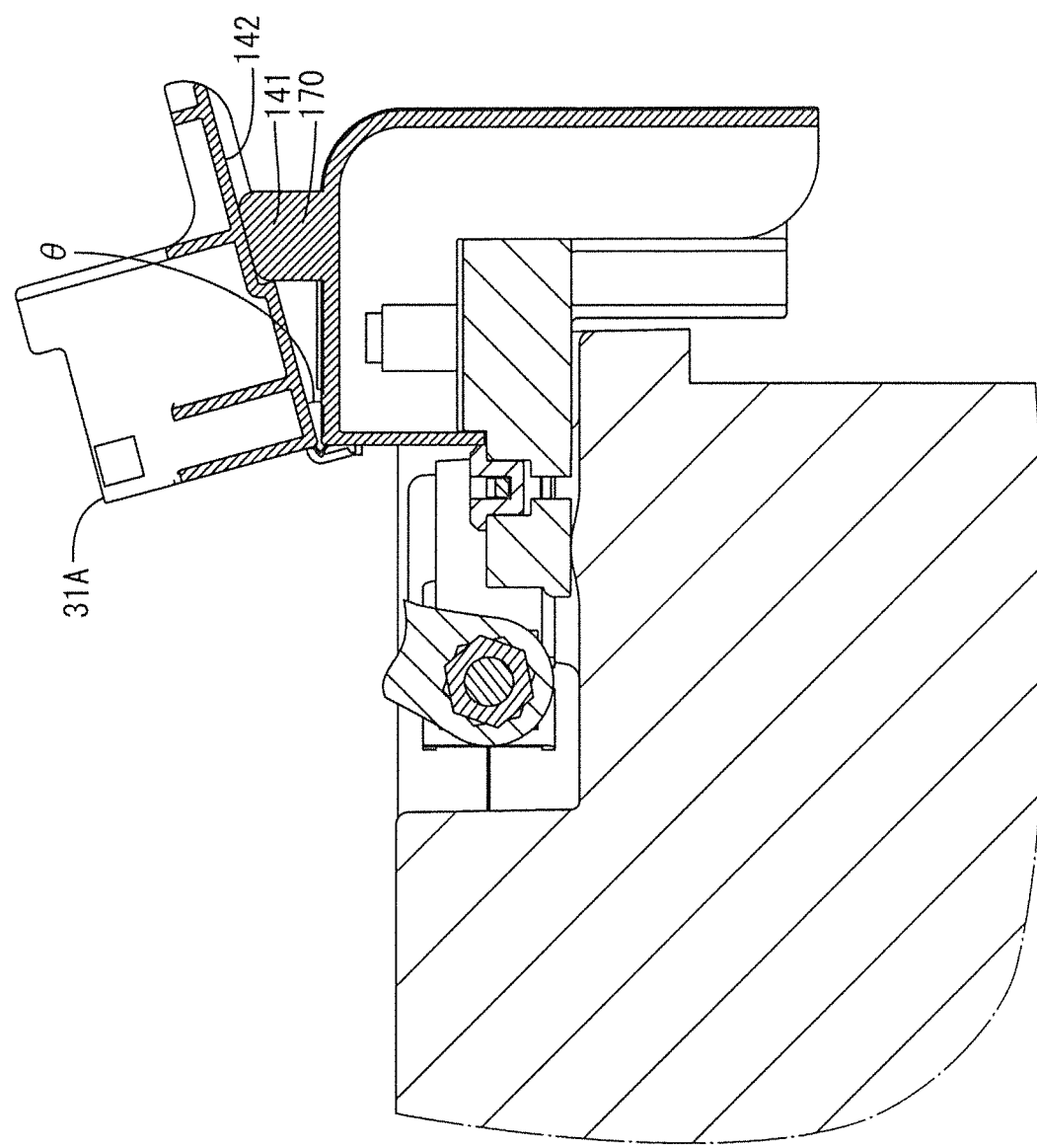
FIG. 21 is a section showing a state where the movable portion is set at an open position.

With a movable portion 20 set at an open position, the upper surfaces of the angle setting portions 170 are in surface contact with bottom surfaces of lateral displacement restricting recesses 142, as shown in FIG. 21. In this way, the movable ceiling plate portion 21 is separated from the fixed ceiling plate 11 and supported at a predetermined angle θ to the fixed ceiling plate 11 with hinges 50 as a center, and inclined somewhat forward.

Figure 22:
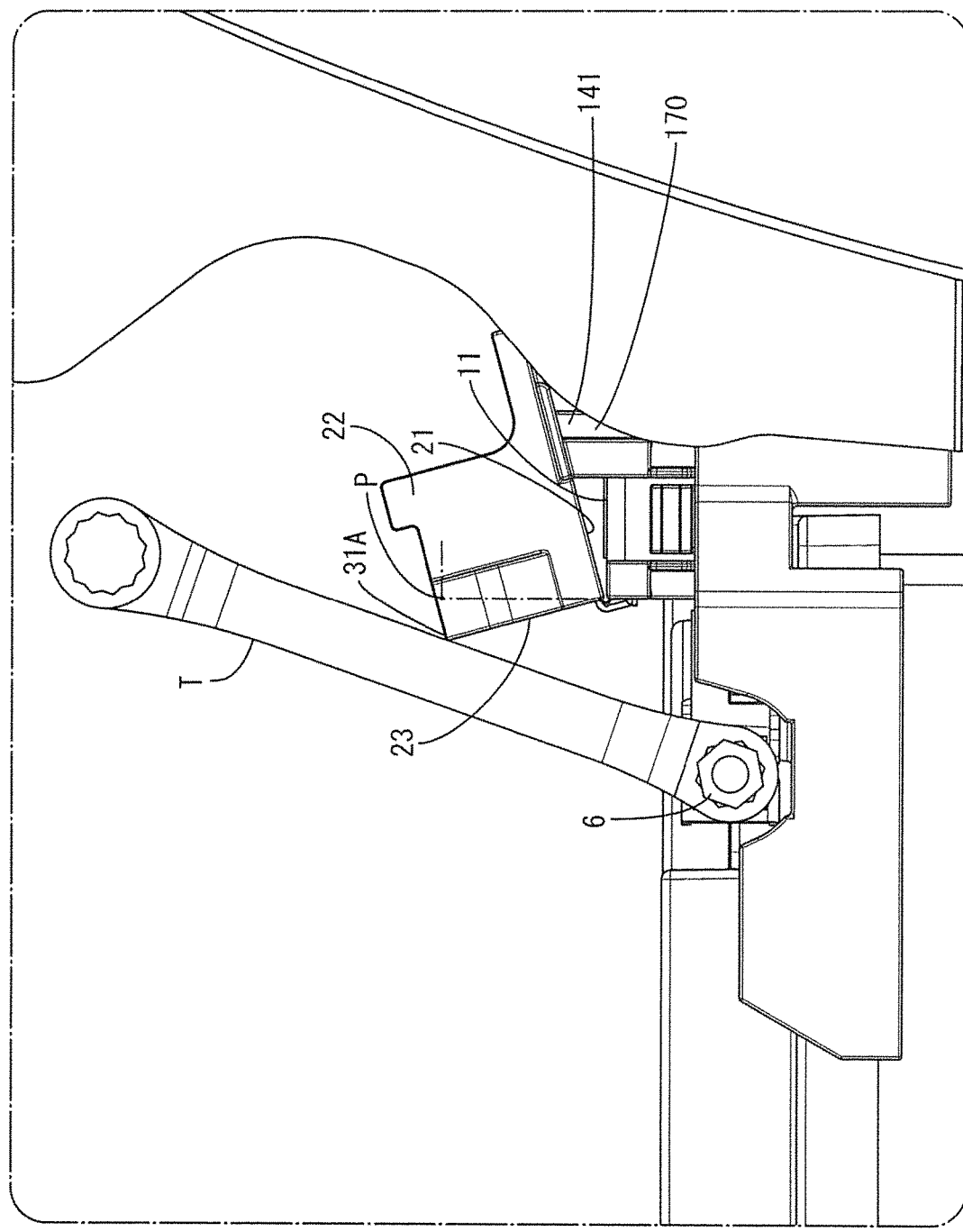
FIG. 22 is a side view showing a state where a tool is being used in a vehicle.

At this time, as shown in FIG. 22, a rotation restricting end portion 31A is arranged above and before a position P, which is above the front end of the upper surface of the fixed ceiling plate 11 by a height of a back plate 23. This causes a tool T to interfere with the rotation restricting end portion 31A at a position separated more from a vehicle C than in the first embodiment to restrict any further rotation.

Figure 23:
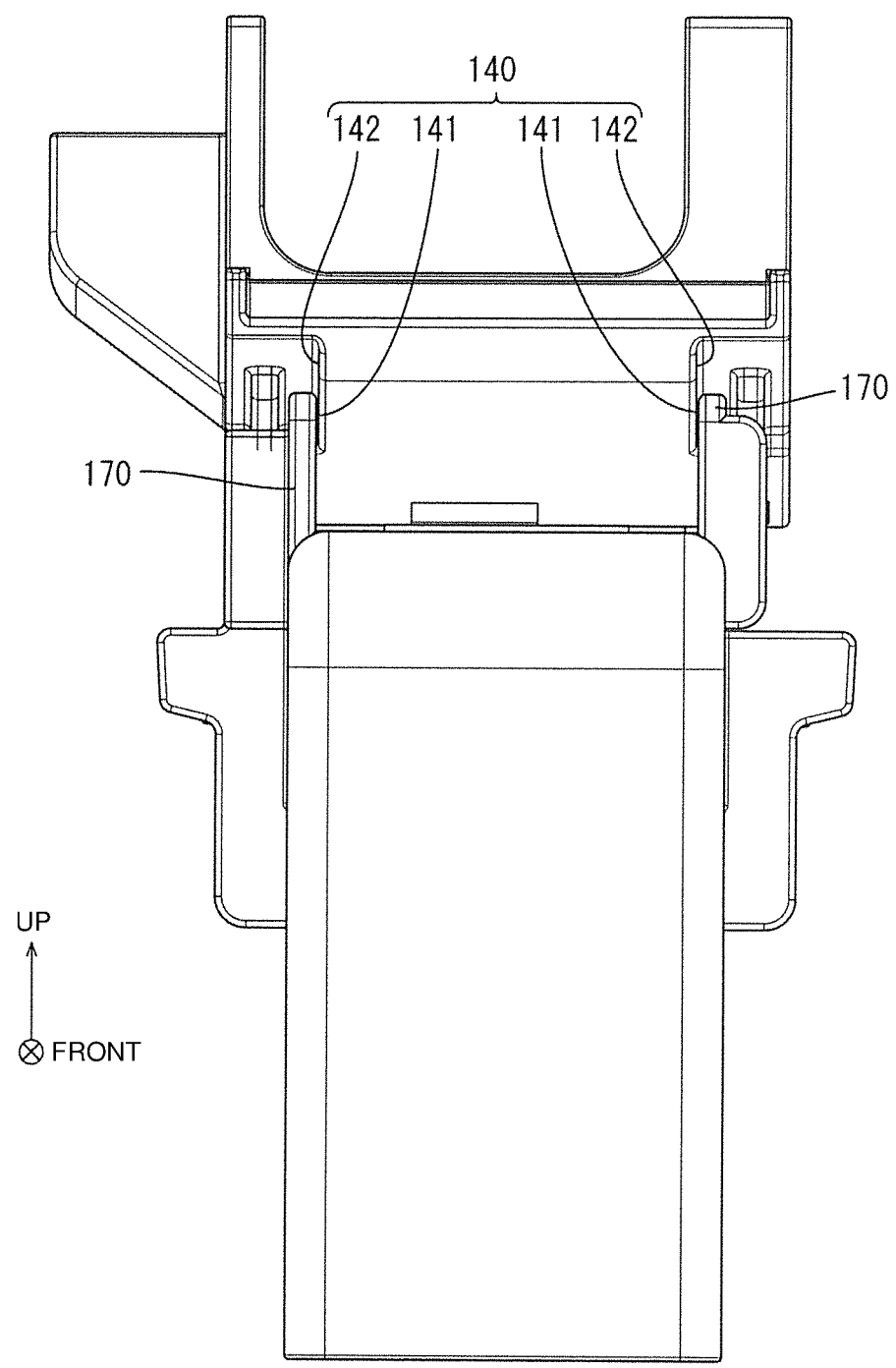
FIG. 23 is a back view showing the state where the movable portion is set at the open position.

Further, in this state, upper parts of the angle setting portions 170 are fit as the lateral displacement restricting ribs 141 into the lateral displacement restricting recesses 142 and can be locked to the lateral displacement restricting recesses 142, as shown in FIG. 23. In this way, a displacement of the tool restricting portion 30 is restricted as in the first embodiment.

As described above, the battery terminal cover 101 includes the angle setting portions 170 for supporting the movable portion 20 at an acute angle to the body 10 to separate the movable portion 20 from the body 10 when the movable portion 20 is open. According to this configuration, the tool restricting portion 30 is arranged according to a height position where the movable portion 20 is supported, the tool restricting portion 30 can be arranged at a desired position.

Further, the angle setting portions 170 project up from the body 10 and the lateral displacement restricting ribs 141 are on the upper end parts of the angle setting portions 170. According to this configuration, the angle setting portions 170 can double as the lateral displacement restricting portion 140. Thus, the angle setting portions 170 and the lateral displacement restricting portion 140 need not be provided separately.

The invention is not limited to the above described and illustrated embodiments and can be, for example, carried out as follows.

Although the tool restricting portion 30 projects up and the tool T comes into contact with the upper end part of the tool restricting portion 30 with the movable portion 20 set at the open position in the first and second embodiments, the shape of the tool restricting portion 30 is not limited to this. For example, if a spanner with a head part and a shaft having a flat shape (so-called straight type) is used as a tool, the tool restricting portion may project from one side plate toward the other side plate of the movable portion (e.g. shaped like the rear wall 31 of the movable portion 20 in the first and second embodiments). In short, the tool restricting portion only has to project into the rotation locus extending until the tool contacts the vehicle with the movable portion set at the open position.

Although the rotation restricting end 31A is disposed flush with the lower end of the movable side plate portion 22, the rotation restricting end 31A may be shaped to extend laterally at the same height as the movable ceiling plate, for example, if the rotation restricting end portion can be arranged at a desired position only by the angle setting portions.

Although the lateral displacement restricting portion 40, 140 is composed of the lateral displacement restricting ribs 41, 141 on the fixed ceiling plate 11 and the lateral displacement restricting recesses 42, 142 provided in the movable ceiling plate 21 in the first and second embodiments, the configuration of the lateral displacement restricting portion is not limited to this. For example, lateral displacement restricting ribs may be provided to project upward from both side edges of the movable ceiling plate and be locked laterally to both side edges of the fixed ceiling plate of the body.

LIST OF REFERENCE SIGNS

1: battery terminal cover
10: body
11: fixed ceiling plate
20: movable portion
21: movable ceiling plate
22: movable side plate
30: tool restricting portion
40: lateral displacement restricting portion
50: hinge
T: tool
2: battery
6: bolt (screw member)
141: lateral displacement restricting rib (lateral displacement restricting portion)
142: lateral displacement restricting recess
170: angle setting portion

What is claimed is:

1. A battery terminal cover to be mounted on a battery to be installed in a vehicle, comprising:
    a body to be fixed to the battery;
    a movable portion coupled to the body via a hinge, the movable portion having a movable ceiling plate, a back plate connected to the movable ceiling plate at the hinge, and first and second movable side plates extending substantially perpendicularly from the ceiling plate, an auxiliary rib connected to the movable ceiling plate and a side of the first movable side plate facing toward the second movable side plate, the auxiliary rib being aligned substantially parallel to the back plate, the movable portion being rotatably displaceable to a shielding position to cover a screw member mounted on the battery and an open position to be overlapped on the body; and
    a tool restricting portion projecting from the first movable side plate of the movable portion in a direction away from the second side plate and parallel to a rotation axis of the screw member, the tool restricting portion including a rear wall aligned with the back plate of the movable portion, an auxiliary rib connected to the movable ceiling plate and a side of the first movable side plate facing toward the second movable side plate, the tool restricting portion restricting the rotation of a tool by interfering with the tool before the tool rotated about the screw member contacts the vehicle with the movable portion at the open position, and the auxiliary rib being at a position opposite the tool restricting portion for resisting deformation of the first movable side plate toward the second movable side plate in response to forces exerted by a tool on the tool restricting portion.

2. The battery terminal cover of claim 1, wherein:
    the body includes a fixed ceiling plate coupled to the hinge and opposed fixed side plates extending substantially perpendicularly from the fixed ceiling plate;
    the tool restricting portion is provided at a position projected farther in an axial direction of the hinge than the movable portion; and
    the movable ceiling plate and the fixed ceiling plate include lateral displacement restricting portions aligned substantially parallel to the fixed side plates and the movable side plates, the lateral displacement restricting portions being spaced from the hinge and the lateral displacement restricting portions being aligned substantially perpendicular to the hinge, wherein the lateral displacement restricting portions are lockable to each other when the movable portion is at the open position.

3. The battery terminal cover of claim 2, wherein:
    the first and second movable side plates project in a direction separating from the body at the open position.

4. The battery terminal cover of claim 1, further comprising an angle setting portion configured to support the movable portion at an acute angle to the body to separate the movable portion from the body when the movable portion is set at the open position.

5. The battery terminal cover of claim 4, wherein:
the angle setting portion projects up from the body and the lateral displacement restricting portion is provided on an upper end part of the angle setting portion.

6. The battery terminal cover of claim 1, wherein a rotation axis of the screw member is parallel to a rotation axis of the movable portion relative to the body about the hinge.

7. A battery terminal cover to be mounted on a battery to be installed in a vehicle, comprising:
a body to be fixed to the battery;
a movable portion including a ceiling plate and opposite first and second side plates extending from the ceiling plate, the ceiling plate being coupled to the body via a hinge, the movable portion being rotatably displaceable to a shielding position to cover a screw member mounted on the battery and an open position to be overlapped on the body; and
a tool restricting portion projecting from the movable portion in a direction parallel to a rotation axis of the screw member, the tool restricting portion having a box shape and including front and rear walls projecting from the first side wall of the movable portion in a direction parallel to a rotation axis of the screw member, the tool restricting portion further having an outer wall spaced outward from the first side plate of the movable portion and extending between the front and rear walls of the tool restricting portion, wherein the tool restricting portion restricts the rotation of a tool by interfering with the tool before the tool rotated about the screw member contacts the vehicle with the movable portion at the open position.

8. The battery terminal cover of claim 7, wherein the tool restricting portion further has ceiling wall extending between the front and rear walls, the outer wall and the first side plate.

9. A battery terminal cover to be mounted on a battery to be installed in a vehicle, comprising:
a body to be fixed to the battery;
a movable portion having a ceiling plate with a rear end joined to the body via a hinge so that the movable portion is rotatably displaceable between a shielding position to cover a bolt mounted on the battery and an open position to be overlapped on the body, the movable portion having a back plate extending from the rear end of the ceiling plate and opposed first and second movable side plates extending from opposite first and second sides of the ceiling plate; and
a tool restricting portion projecting from a surface of the first side plate of the movable portion facing away from the second side plate, the tool restricting portion having a rear wall substantially flush with the back plate of the movable portion, the tool restricting portion restricting the rotation of a tool by interfering with the tool before the tool rotated about the bolt contacts the vehicle with the movable portion at the open position.

10. The battery terminal cover of claim 9, further comprising an angle setting portion configured to support the movable portion at an acute angle to the body to separate the movable portion from the body when the movable portion is set at the open position.

11. The battery terminal cover of claim 9, wherein the tool restricting portion has a box shape with a front wall opposite the rear wall, and an inner side closed by the first side plate of the movable portion.

12. The battery terminal cover of claim 11, wherein the tool restricting portion further has an outer wall spaced outward from the first side plate of the movable portion and extending between the front and rear walls of the tool restricting portion.

13. The battery terminal cover of claim 12, wherein the tool restricting portion further has ceiling wall extending between the front and rear walls, the outer wall and the first side plate.

14. The battery terminal cover of claim 9, further comprising an auxiliary rib connected to the ceiling plate and a side of the first side plate facing toward the second side plate, the auxiliary rib being aligned substantially parallel to the back plate at a position opposite the tool restricting portion for resisting deformation of the first side plate toward the second side plate in response to forces exerted by a tool on the tool restricting portion.

* * * * *